US009440390B2

(12) United States Patent
Takaoka

(10) Patent No.: US 9,440,390 B2
(45) Date of Patent: Sep. 13, 2016

(54) APPARATUS AND METHOD FOR MANUFACTURING THREE-DIMENSIONAL NET-LIKE STRUCTURE

(71) Applicant: C-ENG CO., LTD., Gamagori-Shi, Aichi-Ken (JP)

(72) Inventor: Nobuyuki Takaoka, Gamagori (JP)

(73) Assignee: C-ENG CO., LTD., Gamagori-Shi, Aichi- (JP)

( * ) Notice: Subject to any disclaimer, the term of this patent is extended or adjusted under 35 U.S.C. 154(b) by 174 days.

(21) Appl. No.: 14/125,594

(22) PCT Filed: Aug. 27, 2013

(86) PCT No.: PCT/JP2013/005037
§ 371 (c)(1),
(2) Date: Dec. 12, 2013

(87) PCT Pub. No.: WO2014/038151
PCT Pub. Date: Mar. 13, 2014

(65) Prior Publication Data
US 2015/0197056 A1    Jul. 16, 2015

(30) Foreign Application Priority Data
Sep. 10, 2012    (JP) .................................. 2012-198530

(51) Int. Cl.
B29C 47/30    (2006.01)
B29C 47/34    (2006.01)
B29C 47/90    (2006.01)
(Continued)

(52) U.S. Cl.
CPC ........... *B29C 47/0009* (2013.01); *B29C 47/30* (2013.01); *B29C 47/34* (2013.01); *B29C 47/888* (2013.01); *B29C 47/8895* (2013.01); *B29C 47/905* (2013.01); *D04H 3/03* (2013.01); *D04H 3/033* (2013.01); *D04H 3/037* (2013.01); *D04H 3/16* (2013.01); *B29L 2028/00* (2013.01); *B33Y 10/00* (2014.12); *B33Y 30/00* (2014.12)

(58) Field of Classification Search
CPC combination set(s) only.
See application file for complete search history.

(56) References Cited

U.S. PATENT DOCUMENTS 4,012,249 A * 3/1977 Stapp ....................... D04H 3/14
156/167
4,859,516 A * 8/1989 Yamanaka ................ B32B 5/26
264/178 F (Continued)

FOREIGN PATENT DOCUMENTS

| JP | 2001-328153 A | 11/2001 |
| WO | 01/68967 A1 | 9/2001 |
| WO | 2004/063450 A1 | 7/2004 |
| WO | 2012/035736 A1 | 3/2012 |

*Primary Examiner* — Michael Tolin
(74) *Attorney, Agent, or Firm* — Matthias Scholl, PC; Matthias Scholl

(57) ABSTRACT

The object is to improve the production efficiency of three-dimensional net-like structures while maintaining the surface quality of the three-dimensional net-like structures. A second chute 6 is located below a hole-free region 33 and is provided between first chutes 4a and 4b. Filaments 20a and 20b located on longitudinal sides 22b and 22c at the periphery of assemblies 21a and 21b are in contact with the upper side of inclined surfaces 46a and 46b of the second chute 6. Such contact disturbs the vertical fall of the filaments 20a and 20b and causes the filaments 20a and 20b to be tangled in loops with the adjacent filaments 20a and 20b and pass through the first chutes 4a and 4b and the second chute 6, while being cooled down with water supplied from openings 51a, 51b and 51c.

4 Claims, 26 Drawing Sheets

(51) Int. Cl.
*D04H 3/03* (2012.01)
*D04H 3/037* (2012.01)
*D04H 3/16* (2006.01)
*B29C 47/00* (2006.01)
*B29C 47/88* (2006.01)
*D04H 3/033* (2012.01)
*B33Y 10/00* (2015.01)
*B33Y 30/00* (2015.01)
*B29L 28/00* (2006.01)

(56) References Cited

U.S. PATENT DOCUMENTS

| | | | |
|---|---|---|---|
| 7,377,762 B2 | 5/2008 | Nishibori et al. | |
| 7,625,629 B2* | 12/2009 | Takaoka | 428/220 |
| 7,993,734 B2 | 8/2011 | Takaoka | |
| 2013/0161858 A1 | 6/2013 | Sasaki | |

* cited by examiner

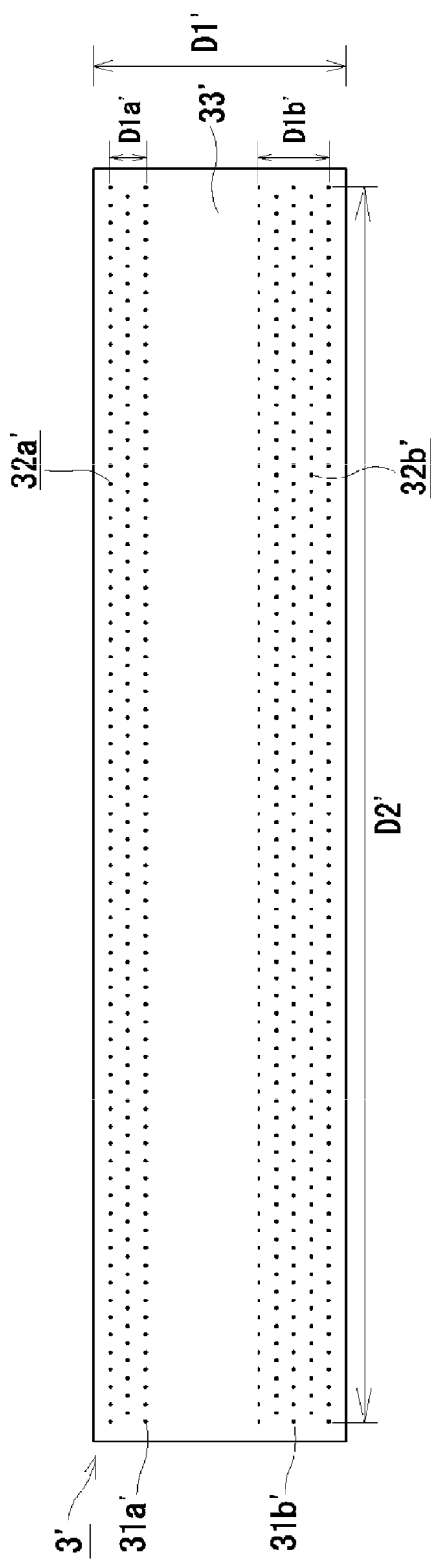
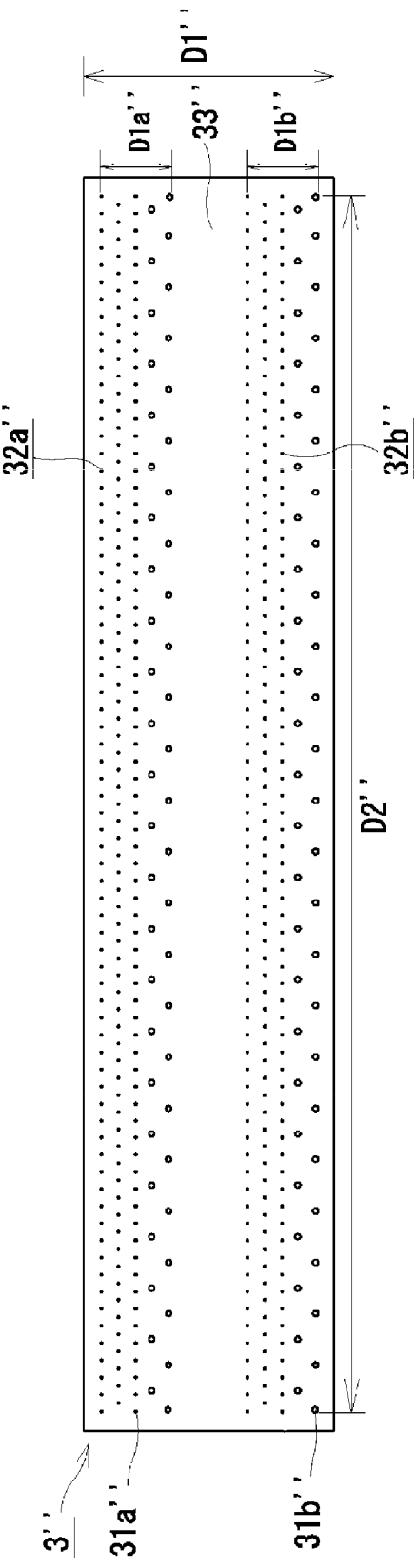
FIG. 3A
FIG. 3B

APPARATUS AND METHOD FOR MANUFACTURING THREE-DIMENSIONAL NET-LIKE STRUCTURE

TECHNICAL FIELD

The present invention relates to a three-dimensional net-like structure manufacturing method and a three-dimensional net-like structure manufacturing apparatus used for, for example, mattresses and cushions.

BACKGROUND ART

Patent Literature 1 discloses a conventional four-face formation method of a three-dimensional net-like structure. This method aims to individual formation of a single three-dimensional net-like structure. Melted filaments made of a thermoplastic synthetic resin as the raw material or as the main material are extruded downward from a die having a nozzle with a plurality of holes at an end to freely fall between partly submerged haul-off machines. The three-dimensional net-like structure is manufactured by hauling of the filaments at a lower rate than the rate of the fall. Two pair of haul-off machines arranged to face each other are provided. A rectangle is formed in a direction perpendicular to the extrusion direction by the above two pairs of haul-off machines. The interval between the facing haul-off machines is set to be less than the width of an assembly of the extruded filaments. All the four peripheral faces of the assembly of the filaments are in contact with the haul-off machines before and after submerging of the haul-off machines, so as to form the three-dimensional net-like structure

CITATION LIST

Patent Literature

PTL1: JP 2001-328153

SUMMARY OF INVENTION

Technical Problem

There has, however, been a diversity of demands for products using such three-dimensional net-like structure; not only the quality requirement for products but reduction of the manufacturing cost and improvement of the production efficiency. The invention described in Patent Literature 1 has limitations on reduction of the manufacturing cost and improvement of the production efficiency. For example, the production rate may be increased for reduction of the manufacturing cost and improvement of the production efficiency. Increasing the production rate may, however, cause the difficulty in stably satisfying the demands on the quality of products with respect to the specifications such as the viscosity of the material and the repulsive force and the dimensional accuracy.

The object of the invention is thus to improve the production efficiency, while satisfying the demands on the quality of products, for example, repulsive force and dimensional accuracy. The object of the invention is also to enable more stable mass production of three-dimensional net-like structures.

Solution to Problem

The invention described in 1 is a three-dimensional net-like structure manufacturing apparatus, comprising: a nozzle configured to have hole groups in multiple rows and a hole-free region without formation of holes formed between the hole groups, wherein assemblies of melted filaments are extruded downward and fall from the holes in multiple rows; a pair of first chutes provided below the nozzle, arranged to face each other across a space and configured to have first inclined surfaces downward inclined toward the assemblies; a first water supply port configured to supply water to the first inclined surfaces; a second chute provided in the space between the pair of first chutes and below the free-hole region and configured to have second inclined surfaces facing the first inclined surfaces; a second water supply port configured to supply water to the second inclined surfaces; and a pair of haul-off machines provided below the first chutes and partly or fully submerged to be in contact with and convey the assemblies in water, wherein when the assemblies pass through between the first chutes and the second chute, the filaments are tangled irregularly and thermally fused to form three-dimensional net-like structures. Water may include warm water and hot water.

The invention described in 2 is a three-dimensional net-like structure manufacturing method, comprising: a. a falling step that causes a plurality of assemblies of filaments of a melted thermoplastic resin to be extruded downward across a predetermined interval and fall from a nozzle configured to have hole groups in multiple rows, each consisting of a plurality of holes, and a hole-free region formed between the hole groups; b. a loop formation step that makes water flow on a pair of first chutes downward inclined toward the assemblies and makes water flow on a second chute to bring the filaments in contact with water and thereby tangle and thermally fuse the filaments irregularly, so as to form loops, while making the assemblies pass through between the first chutes and the second chute; and c. a cooling and solidification step that hauls off the assemblies at a lower rate than the fall of the assemblies by a pair of haul-off machines, so as to submerge the assemblies and thereby cool down and solidify the assemblies.

According to the invention, a pair of chutes may be additionally provided on respective sides of the first chutes to surround the filament assemblies.

The nozzle has multiple rows of holes, each consisting of a plurality of holes. The multiple rows of holes are configured to be applicable to two or more rows according to the requirement of three-dimensional net-like structures to be manufactured.

The holes in the nozzle may be arranged in a rectangular shape. This is, however, not restrictive and the holes may be arranged in an atypical shape having one or more curved sides. In application of the three-dimensional net-like structure to mattresses, the three-dimensional net-like structure is often formed in a rectangular shape. The short-direction sides of a three-dimensional net-like structure form both side faces of a mattress and may thus be curved arbitrarily. In application of the three-dimensional net-like structure to pillows, the three-dimensional net-like structure may be in an entirely curved form. The longitudinal direction and the short direction with respect to the assemblies and the nozzle are used in a relative manner, so that the chutes and the haul-off machines may be arranged in any direction.

The pair of first chutes has inclined surfaces serving to introduce the peripheral side faces of a falling assembly toward the center. The inclined surface may be a flat inclined surface or a curved inclined surface or may be formed in a shape changing the inclination angle in the middle of the inclination. When pairs of first chutes are provided respectively in the longitudinal direction and in the short direction of the assemblies, the respective inclined surfaces may be provided independently or may be provided continuously to be integrated at orthogonal four corners.

The second chute is arranged to face the first chutes and has second inclined surfaces arranged to decrease the interval between the second chute and the first chutes. The two second inclined surfaces are arranged back to back. The second inclined surface may have an inclination angle of 90 degrees, in other words, vertical face. The second chute is preferably formed in a mountain-like shape. The second chute may have an integral structure or a split structure.

The haul-off machines have rotation bodies in contact with the longitudinal sides of the assemblies to hold the assemblies therebetween and haul off the assemblies by their rotations. The rotation bodies are preferably, for example, endless members or endless caterpillar structures. Long-time continuation of the operation of the three-dimensional net-like structure manufacturing apparatus increases the temperature inside of a water tank (especially inside the haul-off machines) and may result in unstable molding conditions. Using the endless caterpillar structures, however, facilitate circulation of cooling water and allow for stable molding conditions. More specifically, cooling water is circulated inside of the endless caterpillar structures, and rotations of the endless caterpillar structures stir the entire water tank. Additionally, cooling water can be readily ejected from the inside of the endless caterpillar structures toward the three-dimensional net-like structures. The rotation bodies are, however, not limited to the endless caterpillar structures but may be, for example, rollers.

The interval between the pair of facing haul-off machines is set equal to or less than the interval between the pair of facing first chutes, for example, preferably by 1 to 30%, more preferably by 2 to 27% and furthermore preferably by 3 to 10%.

The inclined surfaces of the pair of first chutes may be partly submerged. The height of the water surface indicated by the distance from the lower end of the inclined surfaces is preferably 1 to 70 mm, is more preferably 2 to 40 mm and is furthermore preferably 3 to 20 mm.

The interval between the pair of facing first chutes is less than the short-direction array length in the nozzle preferably by 3 to 60%, more preferably by 4 to 50% and furthermore preferably by 5 to 40%.

Embodiments may be configured with omission of either one or both of the combination of the first chutes and the first water supply port and the combination of the second chute and the second water supply port.

The invention described in 3 is a three-dimensional net-like structure manufacturing apparatus, comprising: a nozzle configured to have hole groups in multiple rows and a hole-free region without formation of holes formed between the hole groups to be parallel to a longitudinal direction, wherein assemblies of melted filaments are extruded downward and fall from the holes in multiple rows; a pair of chutes provided below the nozzle, arranged to face each other across a space and configured to have inclined surfaces downward inclined toward the assemblies; a water supply port configured to supply water to the inclined surfaces; and a pair of haul-off machines provided below the chutes and partly or fully submerged to be in contact with and convey the assemblies in water, wherein when the assemblies pass through between the chutes, the filaments are tangled irregularly and thermally fused to form three-dimensional net-like structures.

The invention described in 4 is a three-dimensional net-like structure manufacturing method, comprising: a. a falling step that causes a plurality of assemblies of filaments of a melted thermoplastic resin to be extruded downward across a predetermined interval and fall from a nozzle configured to have hole groups in multiple rows, each consisting of a plurality of holes, and a hole-free region formed between the hole groups to be parallel to a longitudinal direction; b. a loop formation step that makes water flow on a pair of chutes downward inclined toward the assemblies to bring the filaments in contact with water and thereby tangle and thermally fuse the filaments irregularly, so as to form loops, while making the assemblies pass through between the chutes; and c. a cooling and solidification step that hauls off the assemblies at a lower rate than the fall of the assemblies by a pair of haul-off machines, so as to submerge the assemblies and thereby cool down and solidify the assemblies.

The invention described in 5 is a three-dimensional net-like structure manufacturing apparatus, comprising: a nozzle configured to have hole groups in multiple rows and a hole-free region without formation of holes formed between the hole groups, wherein assemblies of melted filaments are extruded downward and fall from the holes in multiple rows; a pair of chutes arranged to have a top located below the hole-free region and configured to have inclined surfaces, which are downward inclined from the top toward the assemblies and arranged back to back; a water supply port configured to supply water to the inclined surfaces; and a pair of haul-off machines provided below the chutes and partly or fully submerged to be in contact with and convey the assemblies in water, wherein when the assemblies pass through along both outsides of the chutes, the filaments are tangled irregularly and thermally fused to form three-dimensional net-like structures.

The invention described in 6 is a three-dimensional net-like structure manufacturing method, comprising: a. a falling step that causes a plurality of assemblies of filaments of a melted thermoplastic resin to be extruded downward across a predetermined interval and fall from a nozzle configured to have hole groups in multiple rows, each consisting of a plurality of holes, and a hole-free region formed between the hole groups; b. a loop formation step that makes water flow on a pair of chutes downward inclined toward the assemblies to bring the filaments in contact with water and thereby tangle and thermally fuse the filaments irregularly, so as to form loops, while making the assemblies pass through along both outsides of the chutes, wherein the pair of chutes are arranged to have a top located below the hole-free region and configured to have inclined surfaces, which are downward inclined from the top toward the assemblies and arranged back to back; and c. a cooling and solidification step that hauls off the assemblies at a lower rate than the fall of the assemblies by a pair of haul-off machines, so as to submerge the plurality of assemblies and thereby cool down and solidify the assemblies.

The invention described in 7 is a three-dimensional net-like structure manufacturing apparatus, comprising: a nozzle configured to have hole groups parallel in multiple rows and a hole-free region without formation of holes formed between the hole groups to be parallel to a longitudinal direction, wherein assemblies of melted filaments are extruded downward and fall from the holes in multiple rows; and a pair of haul-off machines provided below the nozzle and partly or fully submerged to be in contact with and convey the assemblies in water, wherein when the assemblies pass through between the haul-off machines, the filaments are tangled irregularly and thermally fused to form three-dimensional net-like structures.

The invention described in 8 is a three-dimensional net-like structure manufacturing method, comprising: a. a falling step that causes a plurality of assemblies of filaments of a melted thermoplastic resin to be extruded downward across a predetermined interval parallel to the longitudinal direction and fall from a nozzle configured to have hole groups in multiple rows parallel to a longitudinal direction, each consisting of a plurality of holes, and a hole-free region formed between the hole groups to be parallel to the longitudinal direction; and b. a cooling and solidification step that hauls off the assemblies at a lower rate than the fall of the assemblies by a pair of haul-off machines, so as to tangle and thermally fuse the filaments irregularly and thereby form loops, and submerges the plurality of assemblies to cool down and solidify the assemblies.

Advantageous Effects of Invention

According to the invention described in 1, 2, 5 and 6 above, the chutes and the water supply port are provided below the hole-free region of the nozzle and above the haul-off machines to form the facing inner surfaces of the plurality of filament assemblies. This enables a plurality of assemblies to be extruded simultaneously, while satisfying a diversity of requirements with respect to the quality of products, for example, the repulsive force and the dimensional accuracy of the inner surfaces. Such formation of the inner surfaces increases the volume of the surface high-density layer having the large number of tangles of filaments, the low porosity and the high tensile strength.

According to the invention described in 3, 4, 7 and 8 above, the nozzle has the hole groups in multiple rows parallel to the longitudinal direction and the hole-free region with no formation of holes formed between the hole groups to be parallel to the longitudinal direction. This enables a plurality of wide three-dimensional net-like structures such as mattresses to be manufactured simultaneously, while avoiding the excessively long nozzle and haul-off machines.

The invention described in 1 to 8 above improves the production efficiency of three-dimensional net-like structure and enables increased production, for example, simultaneous production of a plurality of mattresses, by a single manufacturing apparatus, while the conventional method requires an increase in number of apparatuses for the increased production. This enables more stable mass production of the three-dimensional net-like structures. Simple replacement of a nozzle having array of holes in multiple rows in existing equipment enables a plurality of three-dimensional net-like structures to be extruded without renewing the residual part of the equipment. This avoids an increase in size of equipment and reduces the renewal expense of the equipment.

The invention also has a significant contribution to the overall manufacturing cost. In the aspect of equipment, the conventional method needs to introduce new equipment to enable increased production while maintaining the quality required by the market. This results in increased investment in equipment. The increased equipment increases the energy cost. Expansion or new construction of factory buildings may be required, accompanied with the increased investment in equipment. This results in an increase in fixed cost. The invention, however, reduces such new investment in factory buildings. The invention especially enables significant cost reduction with respect to the nozzle. Manufacturing a new nozzle occupies a large portion of the investment cost. Providing a mechanism in multiple rows for manufacturing three-dimensional net-like structures reduces the manufacturing cost of the nozzle. This accordingly has a significant effect on reduction of the manufacturing cost. This also has significant effects on reduction of additional costs or overall costs relating to manufacture of products, for example, cost for maintenance of individual pieces of manufacturing equipment and management cost in the manufacturing process of products, as well as the investment cost in equipment.

BRIEF DESCRIPTION OF DRAWINGS

FIGS. 3A and 3B are bottom views illustrating modifications of the nozzle 3 of Embodiment 1;

DESCRIPTION OF EMBODIMENTS

The following describes a three-dimensional net-like structure manufacturing apparatus 1 according to Embodiment 1 of the invention with reference to FIGS. 1 to 9.

Figure 1:
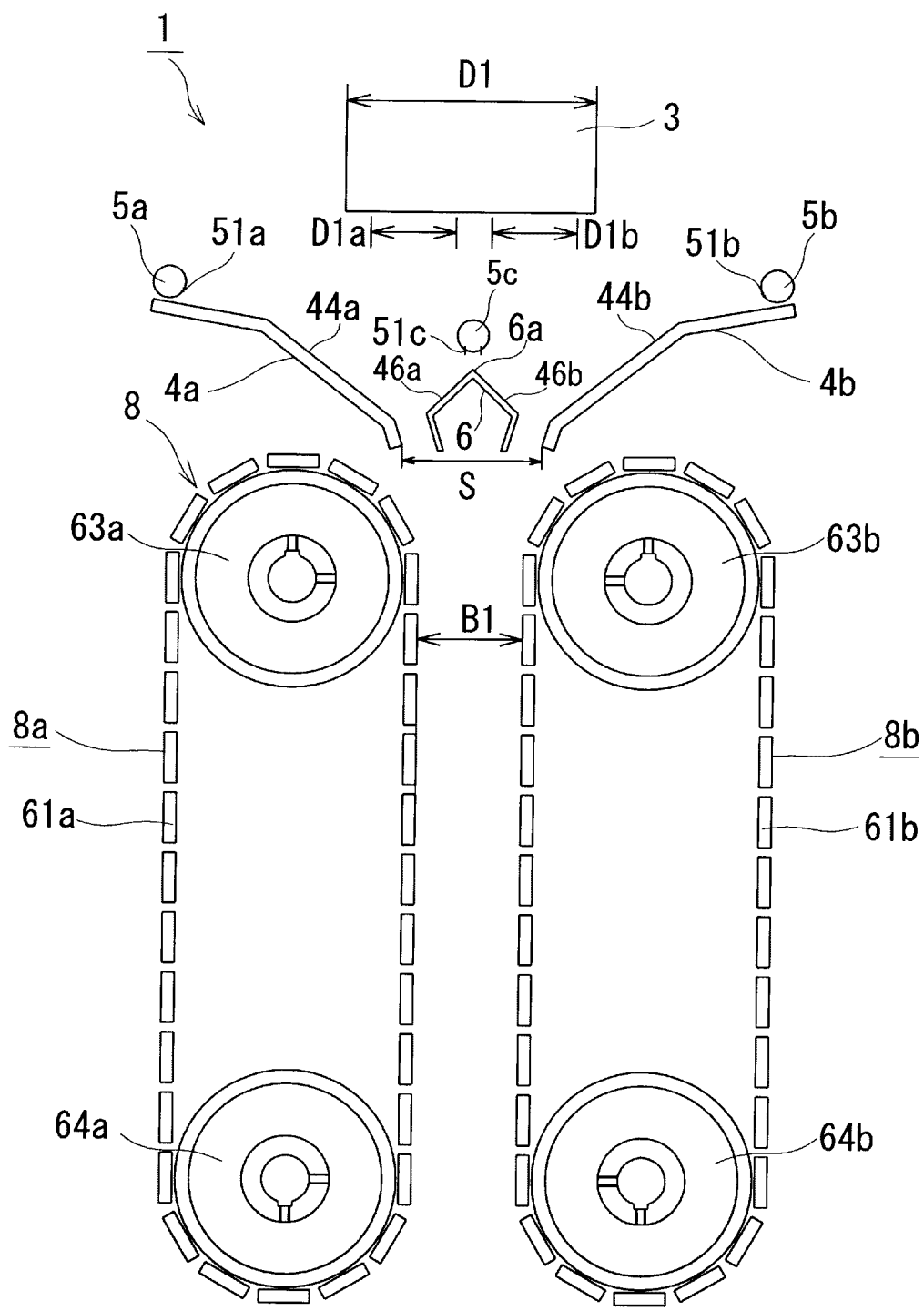
FIG. 1 is a front view illustrating a manufacturing apparatus 1 according to Embodiment 1 of the invention.
Figure 4:
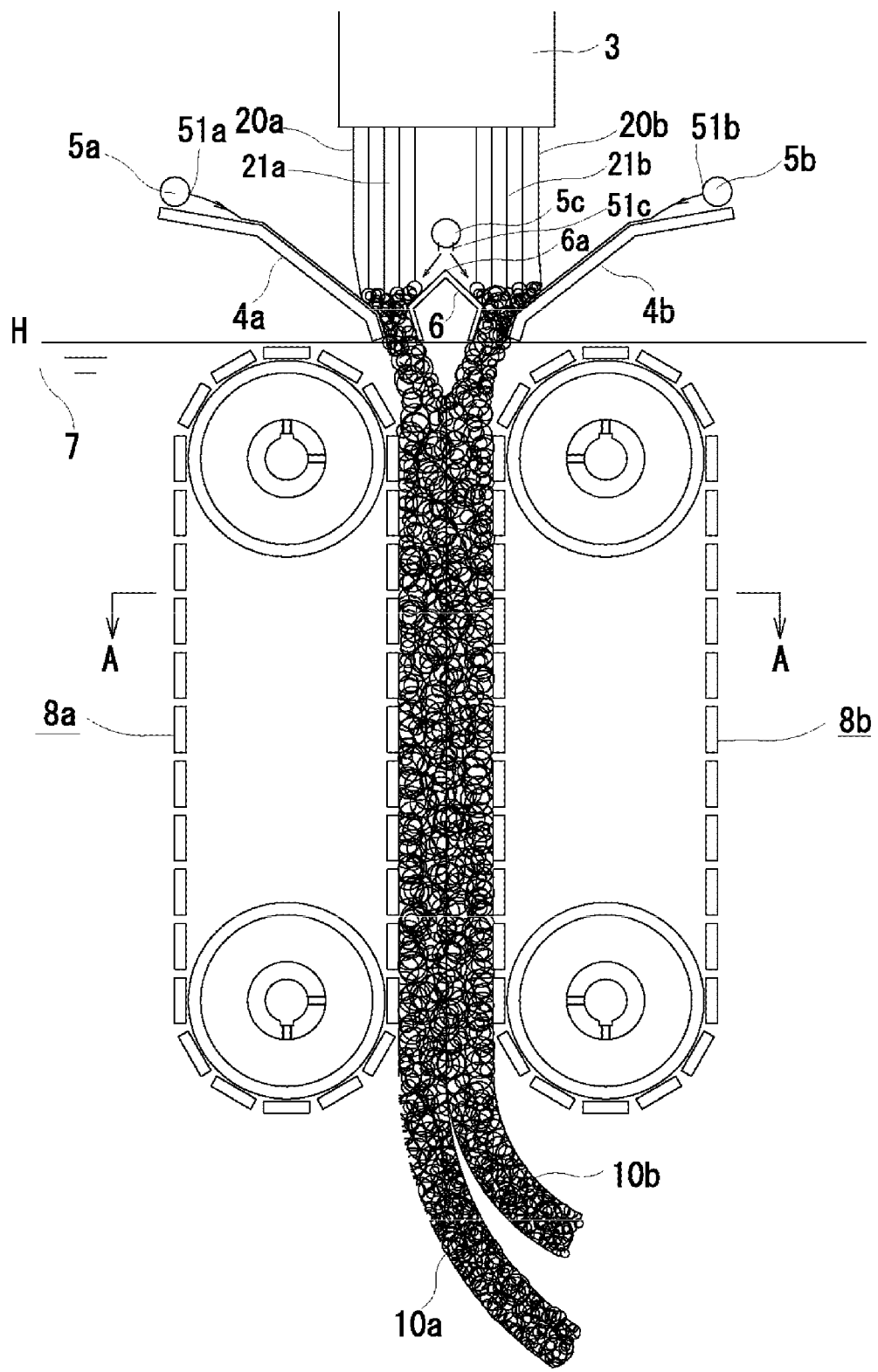
FIG. 4 is a front view illustrating the three-dimensional net-like structure manufacturing apparatus 1 in use according to Embodiment 1.

As shown in FIGS. 1 and 4, the three-dimensional net-like structure manufacturing apparatus 1 is provided as an apparatus for manufacturing three-dimensional net-like structures 10a and 10b having the spring structure formed from a plurality of filaments 20a and 20b which are made of a thermoplastic synthetic resin or the like and are tangled in loops irregularly to be thermally fused. FIGS. 1 and 4 are views from short-direction sides 23a and 23c of the three-dimensional net-like structures 10a and 10b. The manufacturing apparatus 1 includes a nozzle 3, first chutes 4a and 4b provided below the nozzle 3, first water supply ports 5a and 5b provided above the first chutes 4a and 4b, a second chute 6 located below the nozzle 3 and between the first chutes 4a and 4b, a second water supply port 5c provided above a top 6a of the second chute 6, and a pair of haul-off machines 8a and 8b provided below the first chutes 4a and 4b. The respective components are described below.

Figure 2A:
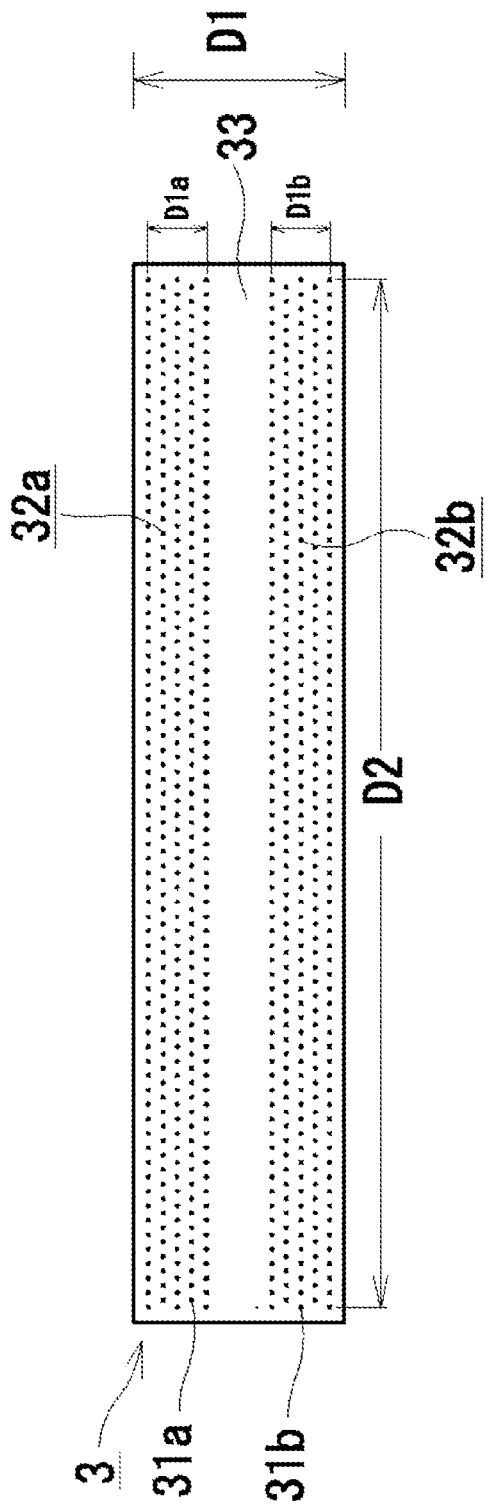
FIG. 2A is a bottom view illustrating a nozzle 3 having arrays of hole groups 32a and 32b according to Embodiment 1.

As shown in FIGS. 1 to 3, the nozzle 3 has two hole groups 32a and 32b formed to respectively have a plurality of holes 31a and a plurality of holes 31b arranged in two rows. According to this embodiment, as shown in FIG. 2A, the plurality of holes 31a are arranged in a rectangle of D1a in width×D2 in length to form the hole group 32a, while the plurality of holes 31b are arranged in a rectangle of D1b in width×D2 in length to form the hole group 32b. In FIG. 2A, the holes 31a and the holes 31b are arrayed in respective regions of the same shape and the same area to form the hole groups 32a and 32b. As shown in FIG. 3A, however, hole groups 32a' and 32b' may have different region widths. Alternatively the hole groups 32a' and 32b' may have different region lengths. Such setting enables three-dimensional net-like structures 10a and 10b having different thicknesses or different widths of resulting products to be manufactured in combination.

As shown in FIG. 3B, the nozzle 3 may have holes 31a" and 31b" of different hole sizes mixed in respective hole groups 32a" and 32b". In this illustrated example, the holes 31b" are arranged to have the greater hole size and the smaller hole density at the lower position. The bulk density may be varied gradually by gradually decreasing the hole density of the hole groups 32a, 32b, 32a', 32b', 32a" and 32b". A low density layer may be interposed between upper and lower high density layers, although this is not specifically illustrated.

Part of the holes 31a and 31b provided in the nozzle 3 may be blocked, and only desired part may be used. This changes the bulk density and the product shape of the three-dimensional net-like structures 10a and 10b. For the purpose of such a change, part of the holes 31a and 31b may be blocked by fixing a plate member to the lower face of the holes 31a and 31b, or the holes 31a and 31b may be individually blocked by blocking members such as rivets. An area without the holes 31a or 31b may be formed in a desired portion in the region where the hole group 32a or 32b is provided.

The region shape of the hole groups 32a and 32b is not limited to the rectangular shape. For example, when the three-dimensional net-like structures 10a and 10b are used for bed mattresses, the hole groups 32a and 32b may be arrayed to form curved side faces in thickness of the mattress. The holes 32a and 32b may be arrayed in an atypical shape such as an elliptical shape or gourd shape. A plurality of three-dimensional net-like structures for a pillow having a gourd-shaped cross section may be extruded simultaneously (see Embodiments 7 and 8). The holes may be arranged to form any of a rectangular shape, a square shape and an atypical shape simultaneously.

A rectangular hole-free region 33 where no holes are formed is provided between the hole groups 32a and 32b. The width of the hole-free region 33 is preferably 5 to 30 mm. The nozzle 3 is integrally formed with and provided below a die (not shown) arranged to apply pressure to a melted thermoplastic synthetic resin and temporarily store the melted thermoplastic synthetic resin. The filaments 20a are ejected from the holes 31a of the hole group 32a, and the filaments 20b are ejected from the holes 31b of the hole group 32b. A filament assembly 21a and a filament assembly 21b are ejected and fall down to be separated from each other across a space (see FIG. 4).

Figure 6A:
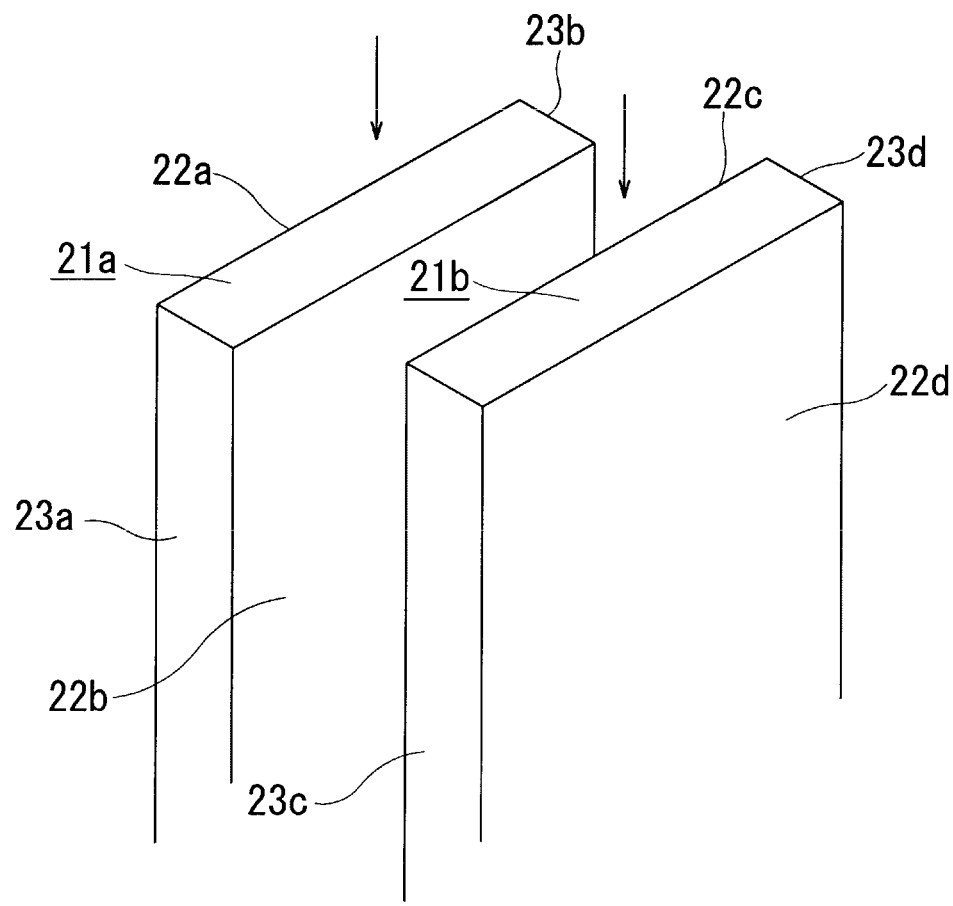
FIG. 6A is a perspective view schematically illustrating assemblies 21a and 21b in a manufacturing process of three-dimensional net-like structures according to Embodiment 1.

As shown in FIG. 6A, the assembly 21a has longitudinal sides 22a and 22b and short-direction sides 23a and 23b on the periphery, and the assembly 21b has longitudinal sides 22c and 22d and short-direction sides 23c and 23d on the periphery. The arrows in FIG. 6A indicate the extrusion direction of the three-dimensional net-like structures 10a and 10b during manufacture.

Figure 2B:
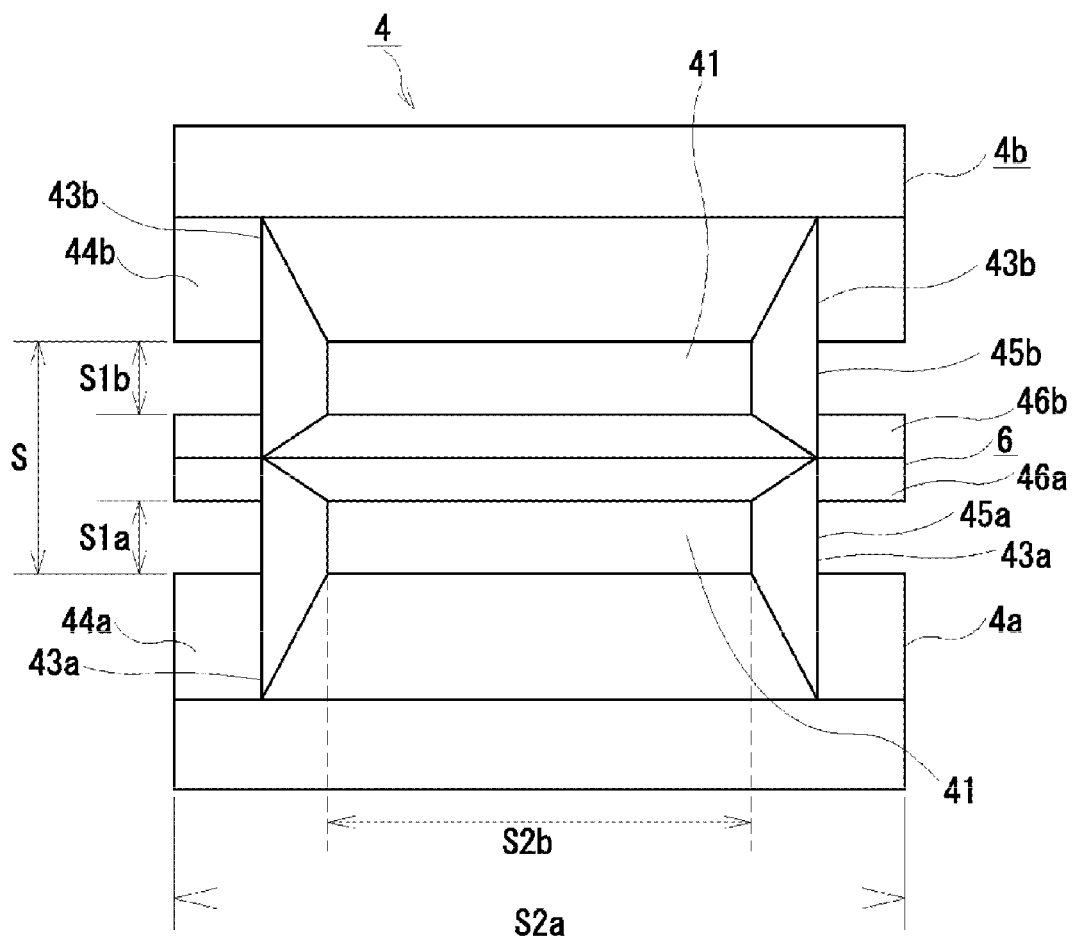
FIG. 2B is a plan view illustrating first chutes 4a and 4b and a second chute 6 according to Embodiment 1.

As shown in FIGS. 1, 2B and 4, the chutes 4 (see FIG. 2B) are provided below the nozzle 3 and includes: the first chute 4a that receives the longitudinal side 22a of the falling assembly 21a (see FIGS. 4 and 6A); the first chute 4b extended to a position that receives the longitudinal side 22d of the assembly 21b; the second chute 6 provided between the first chutes 4a and 4b and extended to positions that receive the longitudinal sides 22b and 22c; chutes 43a extended to positions that receive the short-direction sides 23a and 23b; and chutes 43b extended to positions that receive the short-direction sides 23c and 23d.

As shown in FIGS. 1 and 4, the first chutes 4a and 4b face each other to work in a pair and introduce the peripheral side faces of the falling assemblies 21a and 21b toward the center direction. The pair of first cutes 4a and 4b respectively have inclined surfaces 44a and 44b downward inclined toward the assemblies 21a and 21b. The inclined surfaces 44a and 44b may be in a shape of changing the inclination angle in the middle of the slope as shown in FIG. 1 or may have a fixed inclination angle. The inclined surfaces 44a and 44b are not limited to the illustrated shape but may be curved surfaces.

As shown in FIG. 2B, the chutes 43a and the chutes 43b are respectively provided as pairs of facing chutes located between the first chute 4a and the second chute 6 and between the second chute 6 and the first chute 4b. The chutes 43a and 43b respectively have inclined surfaces 45a and 45b downward inclined toward the assemblies 21a and 21b.

As shown in FIGS. 1, 2B and 4, the second chute 6 has its top 6a located below the hole-free region 33 and between the assemblies 21a and 21b (see FIGS. 4 and 6A) and is provided between the first chutes 4a and 4b. The second chute 6 has an inclined surface 46a downward inclined toward the assembly 21a and an inclined surface 46b downward extended toward the assembly 21b. The second chute 6 has the inclined surface 46a and the inclined surface 46b arranged back to back and is in a mountain-like shape having the top 6a as the joint of these inclined surfaces 46a and 46b at the apex. The inclined surface 46a and the inclined surface 46b may be not necessarily integrated but may be separated. In the second chute 6, the inclined surface 46a is formed to the position that receives the longitudinal side 22b of the assembly 21a, and the inclined surface 46b is formed to the position that receives the longitudinal side 22c of the assembly 21b. The longitudinal side 22b of the assembly 21a and the longitudinal side 22c of the assembly 21b fall down together with water, warm water or hot water along the inclined surfaces 46a and 46b, respectively.

Figure 7A:
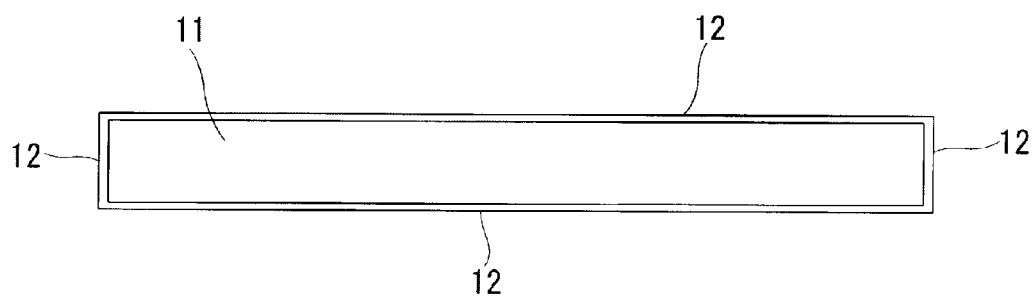
FIG. 7A is a plan view illustrating the cross section of three-dimensional net-like structures 10a and 10b according to Embodiment 1.
Figure 7B:
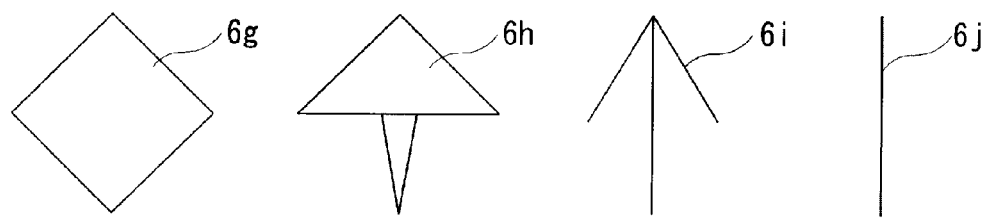
FIG. 7B is a front view illustrating modifications of the second chute 6.
Figure 7C:
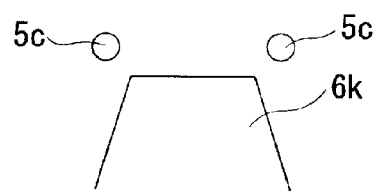
FIG. 7C is a front view illustrating a different modification of the second chute 6.

FIG. 7B shows modifications of the second chute 6; a second chute 6g having a rhomboid-shaped cross section; a second chute 6h having a triangular cross section and having a projection protruded downward from the lower face of the triangular cross section to have a smaller width than the width of the triangular cross section; an umbrella-like second chute 6i; and a second chute 6j of a vertical plate. The second chute 6j is preferably used for a three-dimensional net-like structure without surface layers 12 (see FIG. 7A). FIG. 7C shows another modification of the second chute 6; a second chute 6k having a trapezoidal cross section and having a pair of water supply ports 5c above the trapezoidal cross section. An inverted V shape may replace the trapezoidal shape. The second chute 6 is provided to form the surface layers 12 and prevent fusion between the three-dimensional net-like structures 10a and 10b.

The chutes 4 have two lower openings 41. The pair of first chutes 4a and 4b, the pair of chutes 43a and the pair of chutes 43b are formed in pair and in symmetrical shape via the rectangular openings 41. Each of the openings 41 is tapered downward to have the minimum area on its lowermost face. A width S at the lowest position of the first chutes 4a and 4b is smaller than a width D1 of the nozzle 3. It is preferable to have substantially constant widths of the first chutes 4a and 4b and the second chute 6 at the bottom of the openings 41. A cover (not shown) may be provided in the periphery of the chutes 4 to surround the assemblies 21a and 21b, so as to keep the heat of the assemblies 21a and 21b inside and protect the assemblies 21a and 21b from the outside wind.

As shown in FIG. 2B, there is a width S1a between the first chute 4a and the second chute 6; there is a width S1b between the first chute 4b and the second chute 6; and there is a width S between the first chute 4a and the first chute 4b. The first chutes 4a and 4b and the second chute 6 have a length S2a.

As shown in FIGS. 1 and 2, the width S1a formed at the bottom between the inclined surfaces 44a and 46a is smaller than a width D1a of the hole group 32a. The width S1b formed at the bottom between the inclined surfaces 44b and 46b is smaller than a width D1b of the hole group 32b. Areas defined by the width S1a×S2b and the width S1b×S2b form the two openings 41. The pair of first chutes 4a and 4b, the pair of chutes 43a and the pair of chutes 43b are provided integrally, but may be provided independently or may be provided continuously to be integrated at orthogonal four corners. The pair of chutes 43a and the pair of chutes 43b may be omitted according to the convenience of production. The widths D1a and D1b may be set to be equal to the intervals S1a and S1b.

The width S1a is narrower than the width D1a, and its proportion is preferably 45 to 98%, more preferably 62 to 93% and most preferably 80 to 91%. For example, when the width D1a is 55 to 65 mm, the width S1a may be 50 mm (77% to 91%). When the width D1a is 35 to 45 mm, the width S1a may be 30 mm (67% to 86%). The same applies to the relationship between the width S1b and the width D1b.

The water supply ports 5a and 5b are respectively pipes arranged in the longitudinal direction above the first chutes 4a and 4b to have openings 51a and 51b and supply water to the respective inclined surfaces 44a and 44b (see FIGS. 1 and 4). The water supply ports 5a and 5b are connected to a water supply source (not shown). The water flow from the openings 51a and 51b may be used for water supply to the chutes 43a and 43b. Alternatively a similar water supply source (not shown) may be provided separately above the chutes 43a and 43b. Hot water may be supplied, instead of water.

Figure 6B:
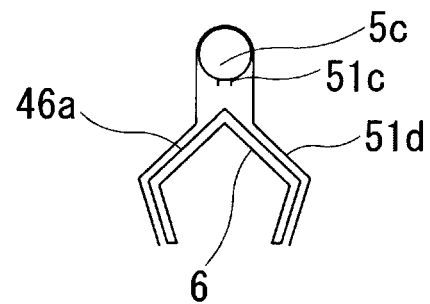
FIG. 6B is a front view illustrating a modification of the second chute 6.

The water supply port 5c is a pipe located below the hole-free region 33 and above the top 6a. An opening 51c is provided in the longitudinal direction of the water supply port 5c to supply water or hot water according to the resin used as the raw material of the three-dimensional net-like structures 10a and 10b, to the respective inclined surfaces 46a and 46b (see FIG. 4). The water supply port 5c is connected to a water supply source (not shown). As shown in FIG. 6B, the inclined surfaces 46a and 46b may be covered with a fabric 51d such as cloth to receive the water flow thereon. The first chutes 4a and 4b may also be covered with similar cloth. This is for the purpose of ensuring the shape stability of the three-dimensional net-like structures 10a and 10b. The inclined surfaces may be shot-blasted, may be coated with Teflon (registered trademark) or may be covered with wire netting sheets.

Figure 5:
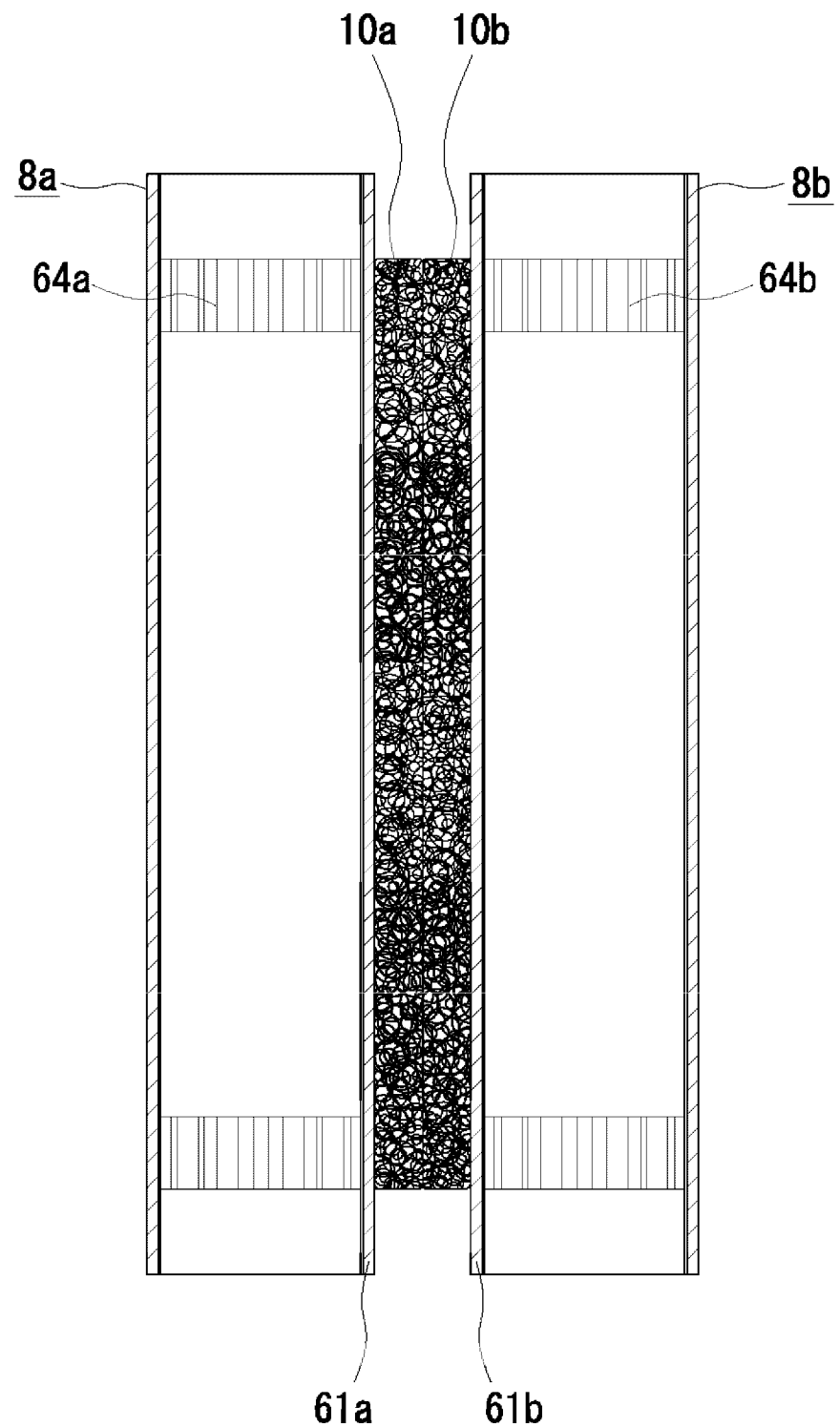
FIG. 5 is a plane sectional view, taken on a line A-A in FIG. 4.

As shown in FIGS. 1, 4 and 5, the pair of haul-off machines 8a and 8b are provided to face each other below the respective first chutes 4a and 4b and include: endless members 61a and 61b provided to be in contact with the longitudinal side 22a of the assembly 21a and the longitudinal side 22d of the assembly 21b; and pulleys 63a, 64a, 63b and 64b arranged to drive the endless members 61a and 61b. The pair of haul-off machines 8a and 8b respectively have drive motors (not shown), chains (not shown) and gears (not shown) for driving the pulleys 63a, 64a, 63b and 64b and additionally have transmissions (not shown) and controllers (not shown) for changing the rotation speed of the endless member 61a or 61b and drive controllers (not shown) including meters and gauges. An interval B1 between the pair of facing haul-off machines 8a and 8b is preferably 30 to 39 mm and especially preferably 35 to 38 mm when the three-dimensional net-like structures 10a and 10b respective having a thickness of 20 mm are extruded in two rows.

The interval B1 between the pair of endless members 61a and 61b is provided to be narrower than the width S (see FIG. 1). The interval B1 is preferably narrower by 1 to 30% than the width S. The narrower degree of less than 1% has little effects on improvement of the repulsive force and the thickness stability of a resulting product. The narrower degree of greater than 30% causes the traces of the endless members 61a and 61b to be left on a resulting product, excessively increases the actuation load of the haul-off machines 8a and 8b and results in the uneven thicknesses of a plurality of three-dimensional net-like structures. The interval B1 is more preferably narrower by 2 to 27% or furthermore preferably narrower by 3 to 10% than the width S.

The pair of haul-off machines 8a and 8b are provided to be fully or partly submerged inside a water tank 7. According to a preferable structure, the interval B1 between the pair of endless members 61a and 61b is freely changeable.

As shown in FIG. 4, the water tank 7 is used to cool down and solidify the assemblies 21a and 21b in the molten state to produce the three-dimensional net-like structures 10a and 10b. A water level H is preferably not lower than the lower ends of the inclined surfaces 44a and 44b of the first chutes 4a and 4b (see FIGS. 4 and 9). In FIG. 4, surface layers have already been formed inside and outside at the position where the filaments 21a and 21b fall down from the first chutes 4a and 4b. The same applies to the subsequent drawings.

Figure 8:
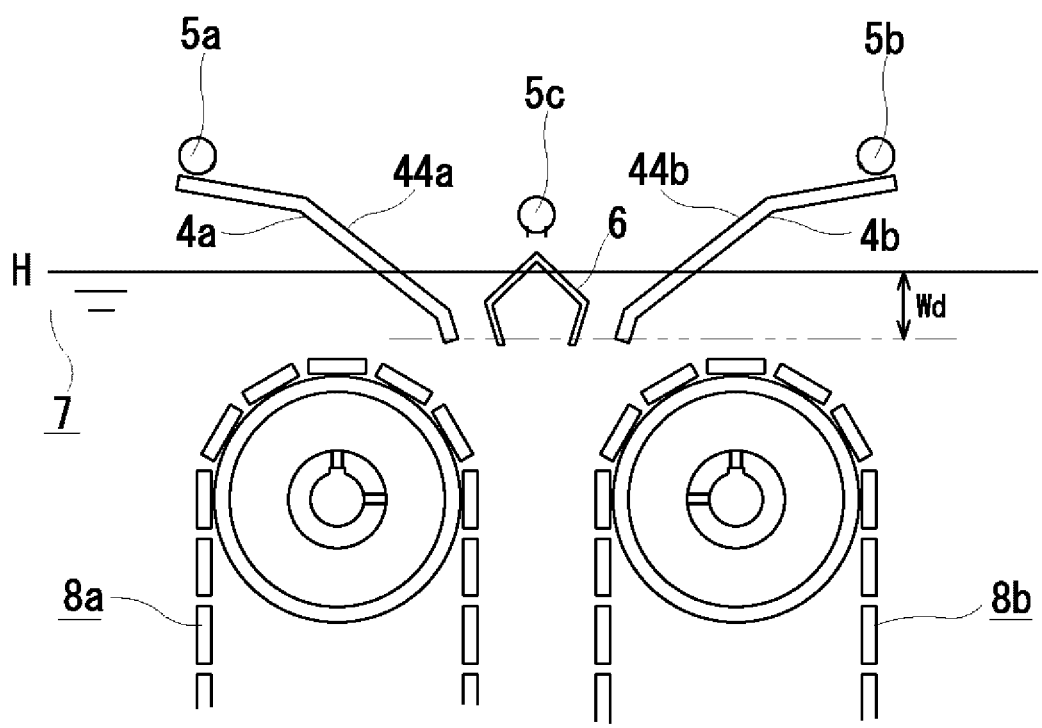
FIG. 8 is a front view showing a height Wd of water surface from lower ends of inclined surfaces 44a and 44b according to Embodiment 1.

The water level H is described in detail. As shown in FIG. 8, the water level H is preferably set on the basis of the lower ends of the inclined surfaces 44a and 44b, although this is not restrictive. The water level H may be the same height as the height of the lower ends of the inclined surfaces 44a and 44b and is preferably higher than this height. When Wd represents a height from the lower ends of the inclined surfaces 44a and 44b, the water level is preferably set at the height of $0 \leq Wd \leq 45$ (mm), is more preferably set at the height of $1 \leq Wd \leq 30$ (mm) and is furthermore preferably set at the height of $3 \leq Wd \leq 22$ (mm).

It is preferable to set the water level height by taking into account a variation in water level at the time of manufacture and the levelness of a machine. Setting the water level H to a height of not less than 3 mm from the lower ends of the inclined surfaces 44a and 44b prevents the water level H from being lower than the lower ends of the inclined surfaces 44a and 44b, although this is affected by manufacturing conditions. When the water level H exceeds 45 mm from the lower ends of the inclined surfaces 44a and 44b, on the other hand, the resin starts solidification under some conditions to cause the poor fusion between the fibers and increase the surface roughness to be an inadequate level.

Figure 9A:
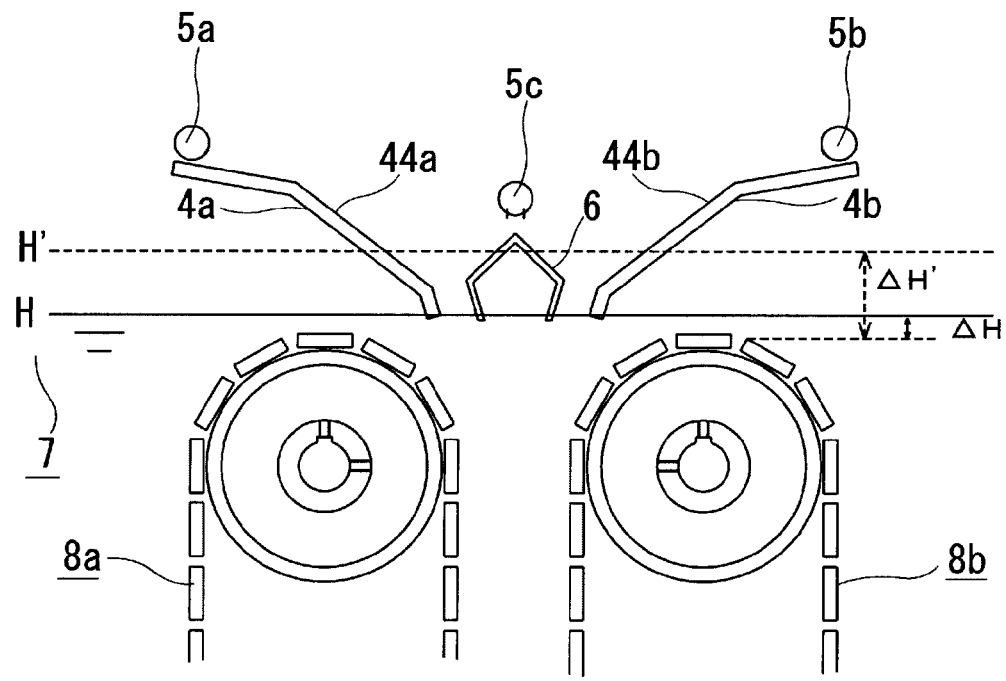
FIGS. 9A and 9B are front views showing relationships between haul-off machines 8a and 8b and water level H according to Embodiment 1.
Figure 9B:
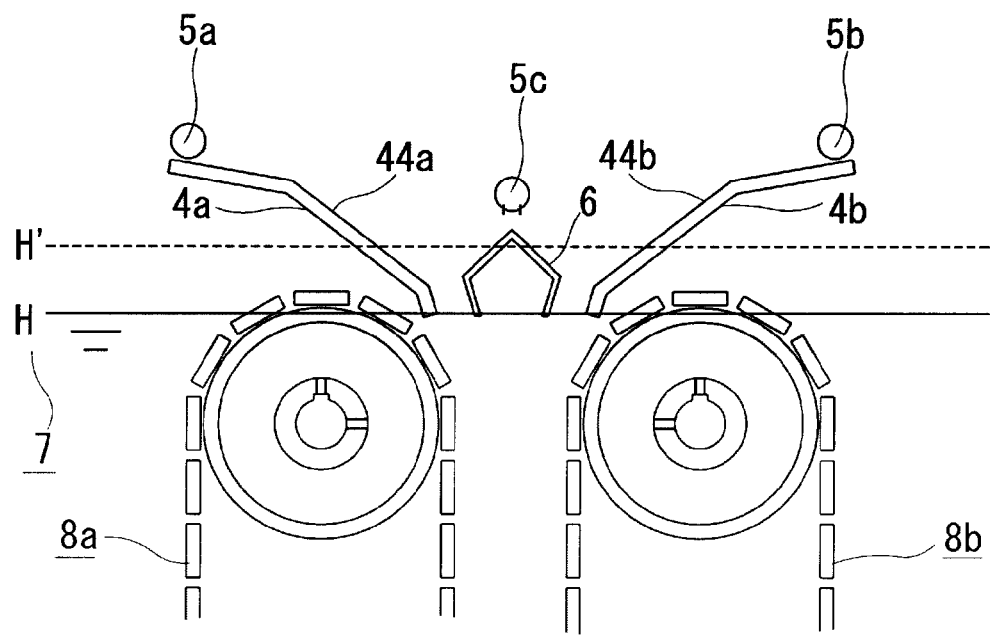

According to Embodiment 1, the three-dimensional net-like structures 10a and 10b are extruded in two rows. As shown in FIG. 9A, it is preferable to increase the distance between the water level H and the haul-off machines 8a and 8b, in order to haul off the two sheets of three-dimensional net-like structures into the haul-off machines 8a and 8b (may be belts or rolls). This arrangement enables the three-dimensional net-like structures 10a and 10b extruded in two rows (or in three or more rows) to be hauled off without bending forcedly. A distance ΔH or ΔH' between the water surface H and the haul-off machines 8a and 8b is preferably 5 to 300 mm, is more preferably 15 to 80 mm and is furthermore preferably 20 to 50 mm. A part of the haul-off machines 8a and 8b may be exposed above the water surface as shown in FIG. 9B. In the arrangement of FIG. 9B, the haul-off machines 8a and 8b are closer to the first chutes 4a and 4b than the arrangement of FIG. 9A, so that the distance ΔH or ΔH' is smaller or takes a negative value.

The following describes the manufacturing method of the three-dimensional net-like structures 10a and 10b by the three-dimensional net-like structure manufacturing apparatus 1 according to Embodiment 1 of the invention with reference to FIG. 4 and other relevant drawings. The known structural parts are not described in detail here; refer to Japanese Patent No. 4350286B and U.S. Pat. No. 7,625,629.

The method first melts a raw material containing a thermoplastic synthetic resin as the main material. The melted raw material is fed into a die (not shown), is pressurized and is extruded downward from the holes 31a and 31b of the nozzle 3 to form the filaments 20a and 20b. The die may be set to have the internal temperature range of 100 to 400° C. and the throughput rate of 20 to 600 kg/hour.

The pressure applied inside the die may be, for example, discharge pressure of a 75 mm screw, and its pressure range is about 0.2 to 25 MPa. In the case of manufacturing the three-dimensional net-like structure 10 having the thickness of greater than 100 mm, for example, it is preferable to equalize the die pressure by using, for example, a gear pump. The filaments 20a and 20b ejected from the nozzle 3 make the assemblies 21a and 21b in two rows by the presence of the hole-free region 33.

The following describes a loop formation step. The filaments 20a and 20b located on the longitudinal sides 22a and 22d at the periphery of the assemblies 21a and 21b are parted from each other and are in contact with the upper side of the inclined surfaces 44a and 44b of the pair of first chutes 4a and 4b. Such contact disturbs the vertical fall of the filaments 20a and 20b and causes the filaments 20a and 20b to flow down along the inclined surfaces 44a and 44b while being cooled down with water supplied from the openings 51a and 51b. The filaments 20a and 20b are tangled in loops with the adjacent filaments 20a and 20b and are introduced obliquely downward toward the center of the assemblies 21a and 21b to form the outer longitudinal sides.

The filaments 20a located on the short-direction sides 23a and 23b at the periphery of the assembly 21a and the filaments 20b located on the short-direction sides 23c and 23d at the periphery of the assembly 21b are similarly slid down along the inclined surfaces 45a and 45b of the pair of first chutes 43a and 43b to similarly form the short-direction sides.

The filaments 20a and 20b located on the inner longitudinal sides 22b and 22c of the assemblies 21a and 21b are in contact with the upper side of the inclined surfaces 46a and 46b of the second chute 6. Such contact disturbs the vertical fall of the filaments 20a and 20b to fall downward separately from each other and causes the filaments 20a and 20b to flow down along the inclined surfaces 46a and 46b while being cooled down with water, warm water or hot water supplied from the opening 51c. The filaments 20a and 20b are tangled in loops with the adjacent filaments 20a and 20b and are introduced obliquely downward toward the center of the assemblies 21a and 21b to form the inner longitudinal sides.

The filaments 20a and 20b of the assemblies 21a and 21b falling without being in contact with any of the inclined surfaces 44a and 44b, the inclined surfaces 45a and 45b and the inclined surfaces 46a and 46b may be in contact with the filaments 20a and 20b that are tangled in loops by the contact with the inclined surfaces 44a and 44b, the inclined surfaces 45a and 45b and the inclined surfaces 46a and 46b as described above. The disturbance of the vertical fall is propagated by this contact. Alternatively these filaments 20a and 20b may be in contact with the water surface. This disturbs the vertical fall of the filaments 20a and 20b. The loops are accordingly formed entirely.

The assemblies 21a and 21b passing through the openings 41 keep the distance from each other when reaching the water surface. This arrangement adequately cools down the assemblies 21a and 21b and prevents fusion between the assemblies 21a and 21b. The haul-off speed by the haul-off machines 8a and 8b is less than the falling speed of the assemblies 21a and 21b, so that the assemblies 21a and 21b are adequately hauled off with keeping the formed loops.

The assemblies 21a and 21b falling down to the location of the endless members 61a and 61b are held in the interval B1 between the endless members 61a and 61b, which is smaller than the sum of the intervals S1a and S1b, to be compressed. At the time when the assemblies 21a and 21b fall down to the location of the endless members 61a and 61b, the assemblies 21a and 21b are not completely cooled down and solidified in the water tank 7 and can thus be compressed and formed to a predetermined shape by the endless members 61a and 61b. As the assemblies 21a and 21b are conveyed downward by the haul-off machines 8a and 8b, the assemblies 21a and 21b formed in the three-dimensional net-like structures are cooled down and are fixed in their shapes. When the assemblies 21a and 21b can be hauled off according to, for example, the size and the elasticity of loops, the width S may be set equal to the interval B1.

The above series of operations are continued to form the two three-dimensional net-like structures 10a and 10b. The three-dimensional net-like structures 10a and 10b have the cross section of almost half size of the interval B1 and are additionally compressed and formed in a substantially plate-like shape by the haul-off machines 8a and 8b. In the application without the chutes 43a and 43b, the short-direction sides 23a and 23b and the short-direction sides 23c and 23 of the three-dimensional net-like structures 10a and 10b may be subjected to end face treatment if appropriate.

Thermoplastic resins and thermoplastic elastomer resins may be used as the raw material of the three-dimensional net-like structures 10a and 10b. Available examples of the thermoplastic synthetic resin include polyolefins such as polyethylene and polypropylene, polyesters such as polyethylene terephthalate, polyamides such as nylon 66, polyvinyl chloride, polystyrene, copolymers and elastomers containing any of these resins as the base, and mixtures containing any of these resins. The raw material may additionally include an antimicrobial agent. In the application of the three-dimensional net-like structures 10a and 10b to bed mattresses, polyethylene is favorably used as the raw material. An antimicrobial agent, a non-combustible material and a flame retardant may be mixed with the thermoplastic synthetic resin as the raw material, so as to cause the three-dimensional net-like structures 10a and 10b to have the relevant functions.

The following describes the three-dimensional net-like structures 10a and 10b manufactured according to Embodiment 1. The three-dimensional net-like structures 10a and 10b are formed from the plurality of filaments 20a and 20b tangled in loops at random and thermally fused. As shown in FIG. 7A, in the three-dimensional net-like structures 10a and 10b, surface layers 12 having the greater bulk density than the bulk density of an inner portion 11 are formed on side faces corresponding to the longitudinal sides 22a and 22b and the short-direction sides 23a and 23b of the assembly 21a and the longitudinal sides 22c and 22d and the short-direction sides 23c and 23d of the assembly 21b.

The three-dimensional net-like structures 10a and 10b may be adopted for, for example, bed mattresses, pillows and cushions, their core members or surface members. In the application to bed mattresses, the three-dimensional net-like structures 10a and 10b may be adopted for the single size, the double size and other sizes of mattresses, for example, the size of 600 to 2000 mm in width and 1300 to 2500 mm in length. The two three-dimensional net-like structures 10a and 10b are endless in the manufacturing process, so that a suitable length of the three-dimensional net-like structures 10a and 10b may be formed to rolled mattresses. This is convenient for delivery and other purposes. The adequate thickness of the three-dimensional net-like structures 10a and 10b differs depending on the bulk density and the product specification but is, for example, preferably 10 to 300 mm, is more preferably 25 to 150 mm and is furthermore preferably 30 to 80 mm. The bulk density is preferably 0.02 to 0.2 g/cm², is more preferably 0.03 to 0.09 g/cm² and is furthermore preferably 0.035 to 0.07 g/cm².

The results of a quality measurement test with respect to the plurality of three-dimensional net-like structures 10a and 10b formed according to Embodiment 1 are shown in Tables 1 and 2, respectively. This measurement test measures the repulsive force and the thickness with respect to the plurality of formed three-dimensional net-like structures 10a and 10b. Each value is the average of measurement values at three different points in a center portion.

An example of measurement of the repulsive force is described. A load was applied to the center of the mattress of each of the three-dimensional net-like structures 10a and 10b via a disc of 150 mm $\phi$, and the forces applied to depress the mattress to 5 mm and 10 mm were measured as repulsive forces. The instruments used for this measurement were digital force gauge ZPS and load cell ZPS-DPU-1000N manufactured by Imada Co., Ltd.

TABLE 1

(Bulk density 0.052 g/cm³, weight 650 g)

| | | Center of 1st Sheet | Center of 2nd Sheet |
|---|---|---|---|
| Repulsive | Depression 5 mm | 54.9 | 53.9 |
| Force (N) | Depression 10 mm | 83.4 | 82.4 |
| Thickness (mm) | | 25 | |

TABLE 2

(Bulk density 0.045 g/cm³, weight 562 g)

| | | Center of 1st Sheet | Center of 2nd Sheet |
|---|---|---|---|
| Repulsive | Depression 5 mm | 32.4 | 32.4 |
| Force (N) | Depression 10 mm | 65.7 | 66.7 |
| Thickness (mm) | | 25 | |

In Tables 1 and 2, one example of the manufactured three-dimensional net-like structures 10a and 10b have the size of 25 mm×500 mm×1000 mm in thickness, width and length and the weight of 500 to 800 g. The test measured the three-dimensional net-like structures 10a and 10b in the middle of 500 mm in the width direction. The width direction herein corresponds to the longitudinal direction in arrays of the hole groups 32a and 32b in the manufacturing process.

According to this embodiment, even when a plurality of sheets of filament assemblies 21a and 21b are extruded simultaneously, the second chute 6 and the second water supply port 5c serve to prevent fusion between the opposed inner surfaces of the filament assemblies 21a and 21b. Additionally, the second chute 6 serves to compress and form the opposed inner surfaces of the filament assemblies 21a and 21b. This arrangement enables production of filament assemblies of the stable quality even when a plurality of sheets are extruded simultaneously.

The hole groups 32a and 32b are arrayed in multiple rows parallel to the longitudinal direction, and the hole-free region 33 without holes is provided between the hole groups 32a and 32b and arranged parallel to the longitudinal direction. This arrangement enables even a plurality of wide sheets, such as mattresses, to be produced simultaneously by one molding operation. Simple replacement of the nozzle 3 having array of holes in multiple rows in existing equipment enables a plurality of sheets to be molded without renewing the residual part of the equipment. This accordingly reduces the renewal expense of the equipment.

Additionally, simultaneous production of the two three-dimensional net-like structures 10a and 10b improves the production efficiency and enables increased production by the single three-dimensional net-like structure manufacturing apparatus 1, while the conventional method requires an increase in number of apparatuses for the increased production. This enables more stable mass production of the three-dimensional net-like structures.

This makes a significant contribution to the overall manufacturing cost. Especially in the aspect of equipment, there is no need of introducing a new apparatus for increased production with keeping the quality required by the market. This allows significant cost reduction in investment on equipment. A single apparatus works for two apparatuses. This also reduces the energy cost and especially enables significant cost reduction with respect to the nozzle 3. Manufacturing a new nozzle 3 occupies a large portion of the investment cost. Providing a mechanism in two rows for manufacturing three-dimensional net-like structures reduces the manufacturing cost of the nozzle 3. This accordingly has a significant effect on reduction of the manufacturing cost. For example, three-dimensional net-like structures 10a and 10b of different thicknesses may be manufactured in combination by setting different region widths to the hole groups 32a' and 32b' (see FIG. 3A).

According to Embodiment 1, the holes 31a and 31b may be formed over the entire bottom face of the nozzle 3. Arbitrarily selected holes 31a and 31b may be used according to a desired location of the hole-free region 33 and the thicknesses, the shapes and the bulk densities of the three-dimensional net-like structures 10a and 10b, while the other holes 31a and 31b may be blocked temporarily. This enables the versatile use of a single nozzle 3. The embodiment of the invention may be applied by setting the hole-free region 33 in an existing nozzle used without application of the invention. This allows for the effective use of the existing equipment. In other words, there is no need of producing the nozzle 3 according to every desired location of the hole-free region 33 and every thickness, shape and bulk density of the three-dimensional net-like structures 10a and 10b. This enables significant cost reduction of the nozzle 3.

According to Embodiment 1, the width D1a of the hole group 32a in the first row may be different from the width D1b of the hole group 32b in the second row. Molding two or more faces is also allowable. The first chutes 4a and 4b may be located unsymmetrically, instead of symmetrically. The inclination angle of the second chute 6 is preferably equal to the inclination angle of first chutes 4a and 4b or greater than the inclination angle of the first chutes 4a and 4b.

According to Embodiment 1, a portion of the lower bulk density and a portion of the higher bulk density may be formed in the thickness direction (direction corresponding to D1 in FIG. 2A) or in the width direction (direction corresponding to D2 in FIG. 2A) of the three-dimensional net-like structures 10a and 10b by blocking arbitrarily selected holes 31a and 31b or by increasing the hole size of part of the holes 31a" and 31b" (see FIG. 3B). This is, however, not restrictive, but such density-varying structure may be formed in the extrusion direction (direction corresponding to the arrows in FIG. 6A) of the three-dimensional net-like structures 10a and 10b by adjusting the haul-off speed of the haul-off machines 8a and 8b or by adequately selecting the raw material of the filaments 20a and 20b. The embodiment of the invention may be applied to various three-dimensional net-like structures 10a and 10b, for example, those having harder edges, those having surface layers of different thicknesses on the front side and the rear side, those having different softness on the front side and the rear side and those having hollow portions inside.

Embodiment 1 is suitable for thin, low bulk-density products, for example, in an application in combination with cotton or unwoven fabric. In an application without needing the surface layers, for example, in the case of using the three-dimensional net-like structures 10a and 10b as batting of mattresses, the first chutes 4a and 4b may be omitted, or the second chute 6 may be omitted. The higher-density surface layers formed on the outside may be omitted by raising the water level H to the water level H'. The fabric 51d (see FIG. 6B) may be provided on the surface of the first chutes 4a and 4b and/or the second chute 6 to stabilize the water flow. Applications without using the first chutes 4a and 4b or the second chute 6 are described in Embodiment 3 and subsequent embodiments.

The following describes a three-dimensional net-like structure manufacturing apparatus 101 according to Embodiment 2 of the invention with reference to FIGS. 10 to 15. The respective components are shown by the like numerals to those of Embodiment 1 in the 100s; the description of Embodiment 1 is incorporated here and different points are mainly described below. Embodiment 2 replaces the hole groups 32a and 32b in two rows of Embodiment 1 with hole groups 132a, 132b and 132c in three rows, the single hole-free region 33 with two hole-free regions 133a and 133b, the chutes 4 having the two openings 41 with chutes 104 having three openings 141, the single second chute 6 with two second chutes 106a and 106b and the single water supply port 5c with two water supply ports 151c and 151d to manufacture three sheets of three-dimensional net-like structures 110a, 110b and 110c simultaneously. Otherwise the configuration and the manufacturing method are basically similar to those of Embodiment 1, and the description in Embodiment is employed.

Figure 10:
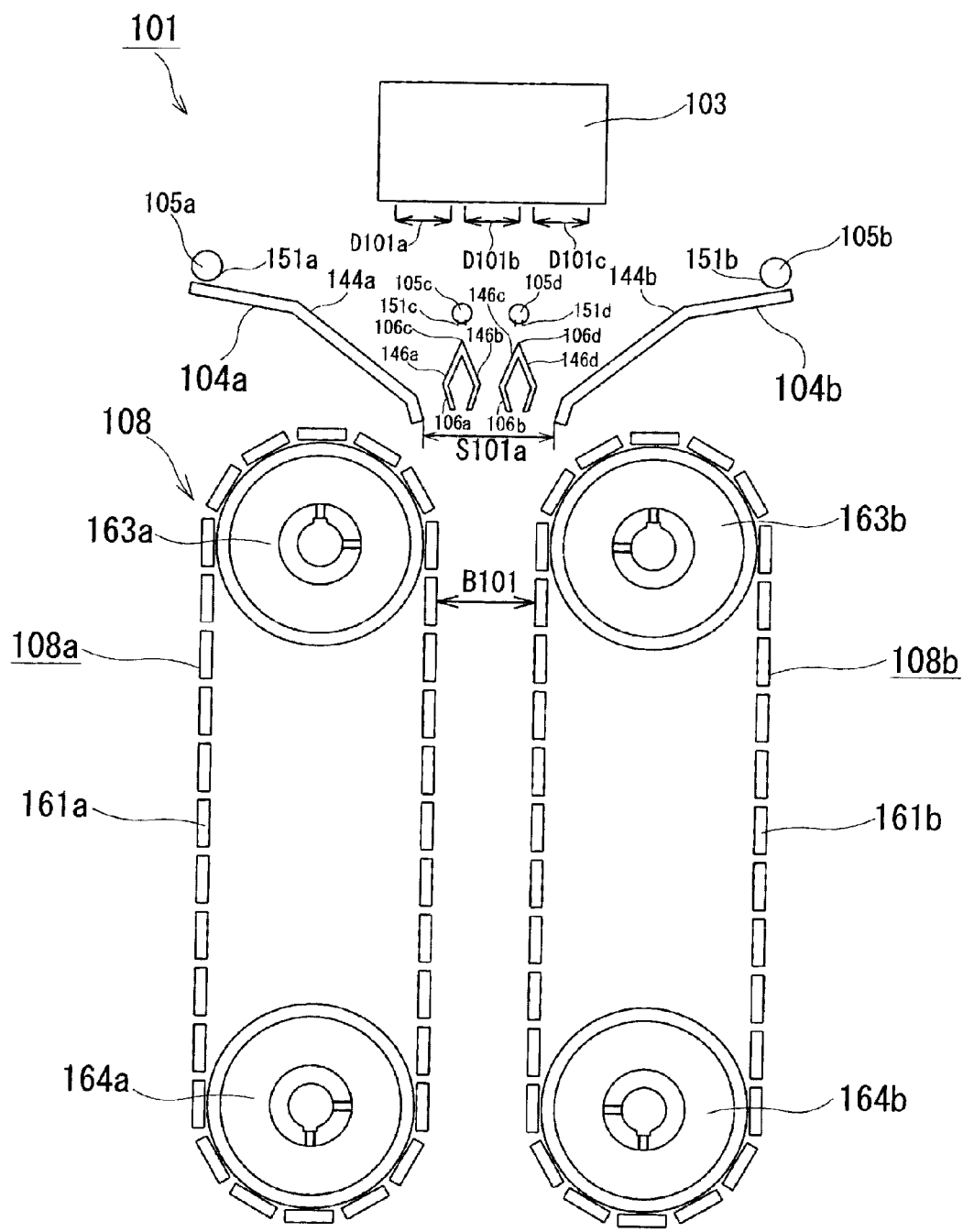
FIG. 10 is a front view illustrating a manufacturing apparatus 101 according to Embodiment 2 of the invention.
Figure 11A:
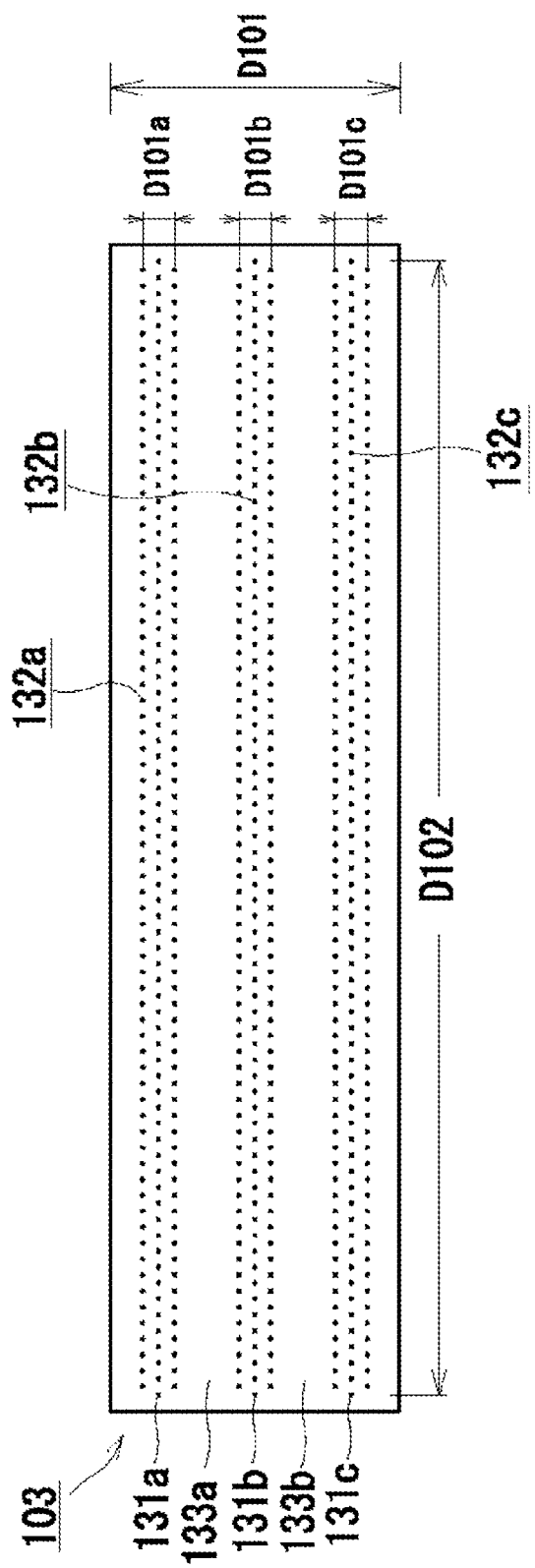
FIG. 11A is a bottom view illustrating a nozzle 103 having arrays of hole groups 132a, 132b and 132c according to Embodiment 2.
Figure 12:
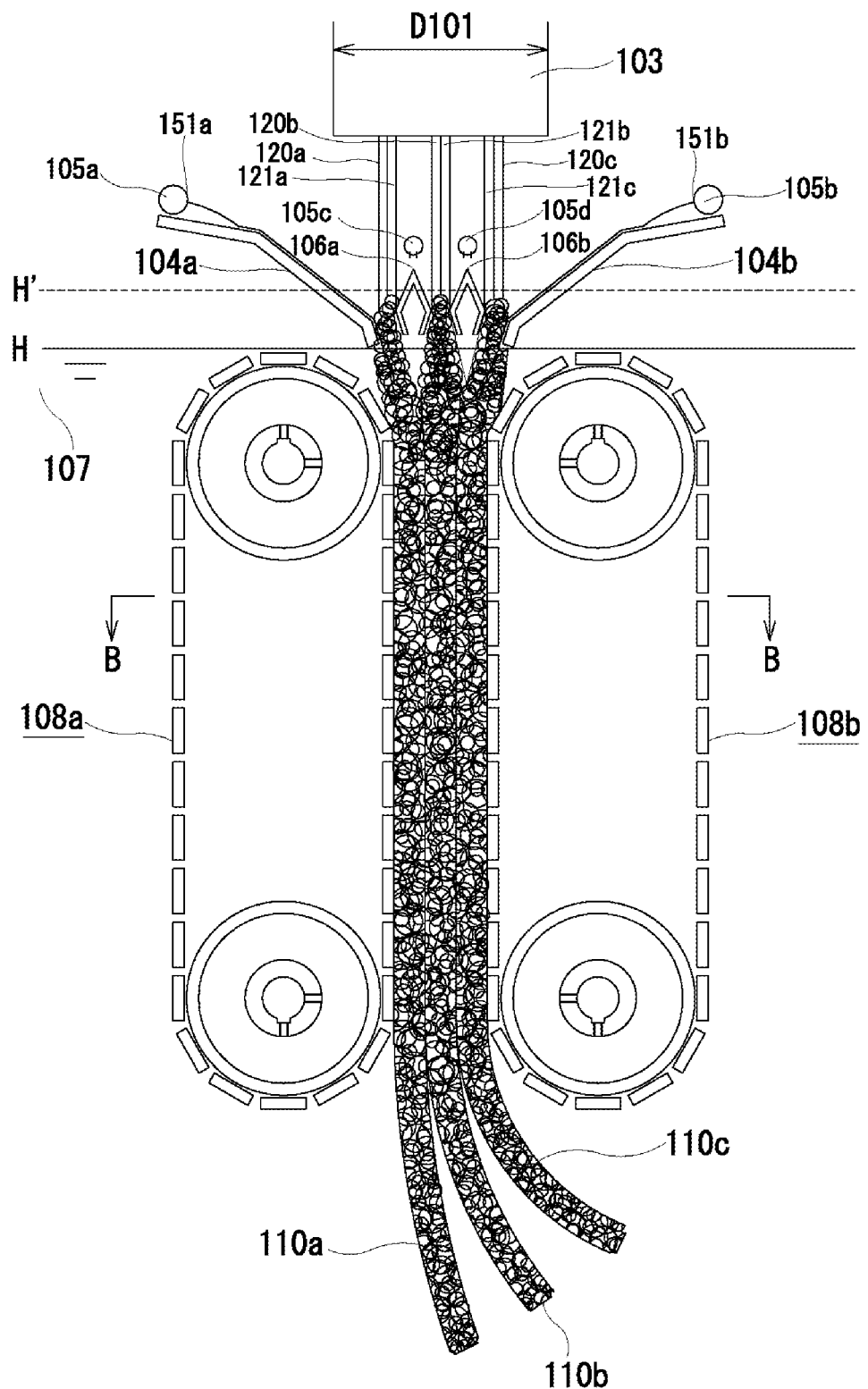
FIG. 12 is a front view illustrating the manufacturing apparatus 101 in use according to Embodiment 2.
Figure 13:
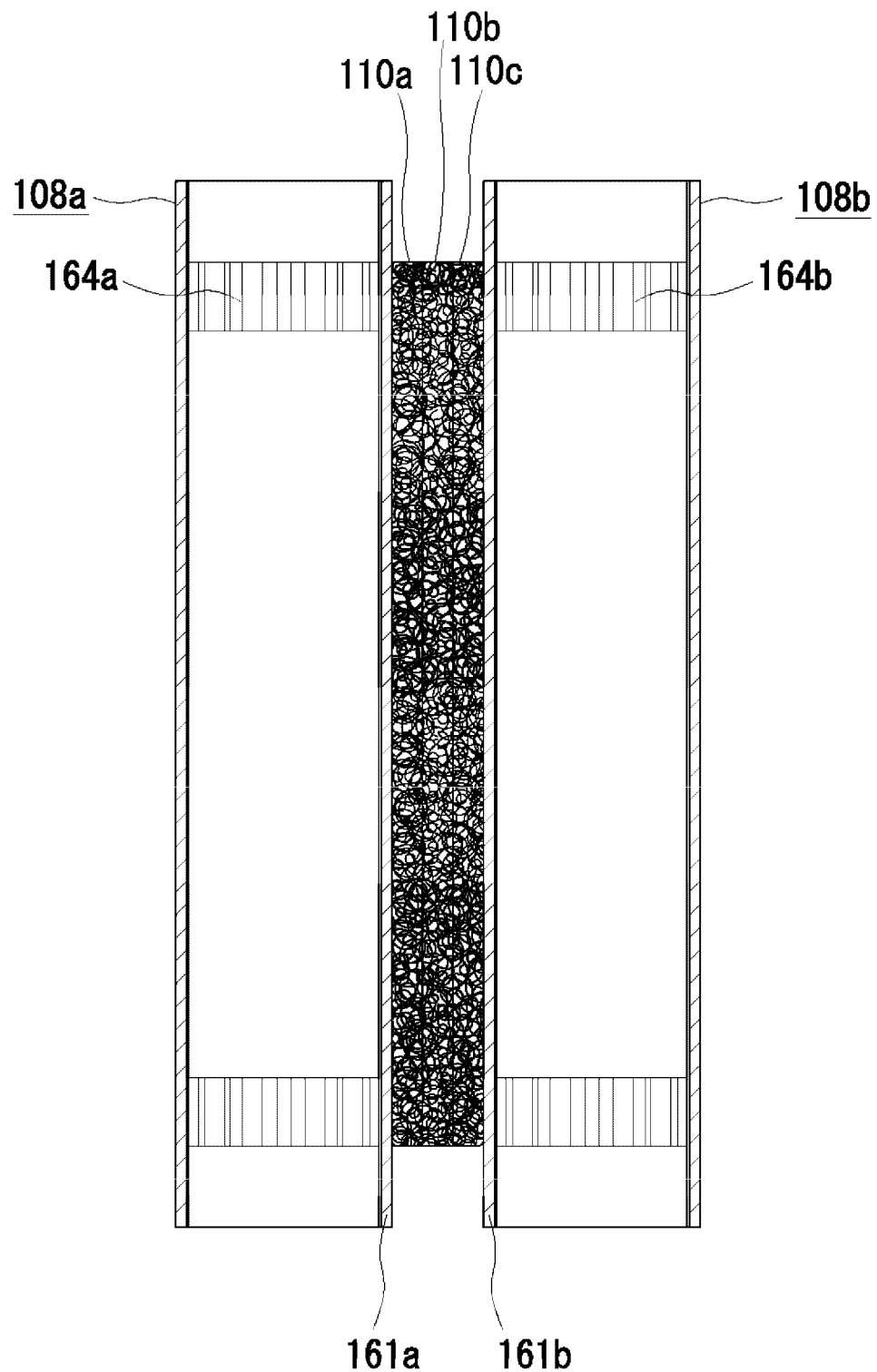
FIG. 13 is a plane sectional view, taken on a line B-B in FIG. 12.
Figure 14:
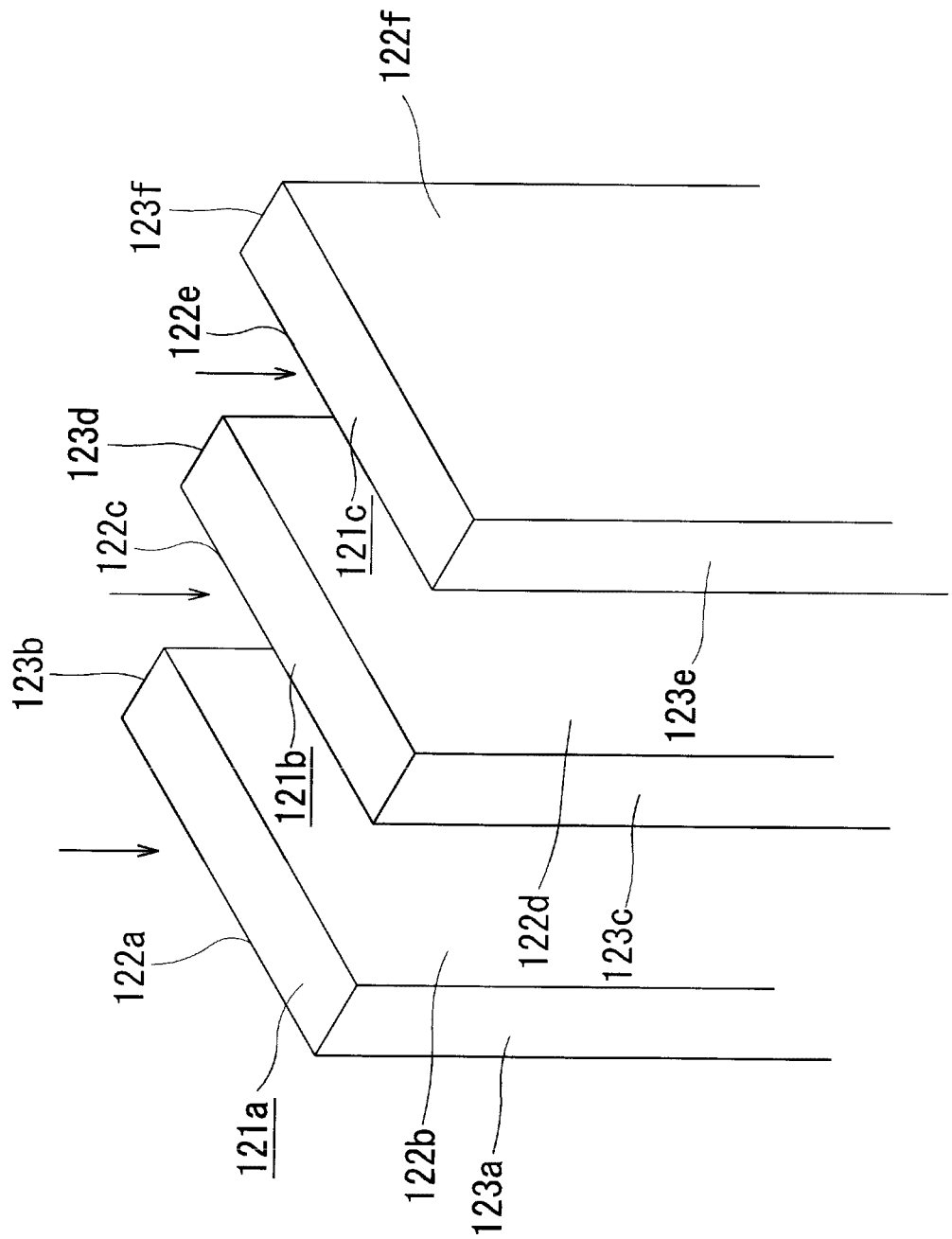
FIG. 14 is a perspective view schematically illustrating assemblies 121a, 121b and 121c in a manufacturing process of three-dimensional net-like structures according to Embodiment 2.
Figure 15A:
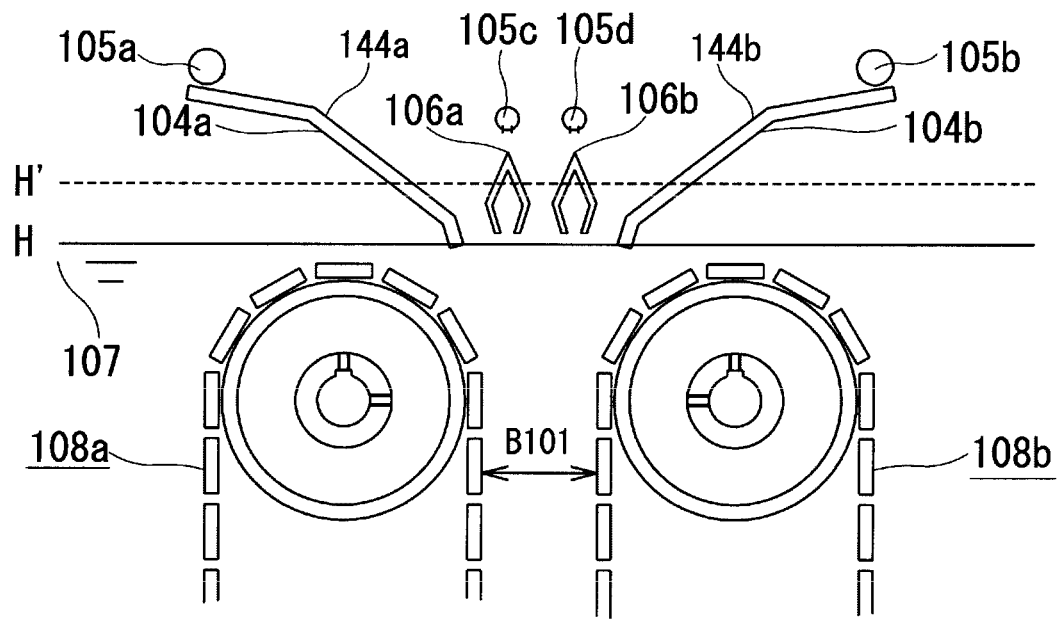
FIGS. 15A and 15B are front views showing a change in water level H by the set height of the first chutes 104a and 104b according to Embodiment 2.
Figure 15B:
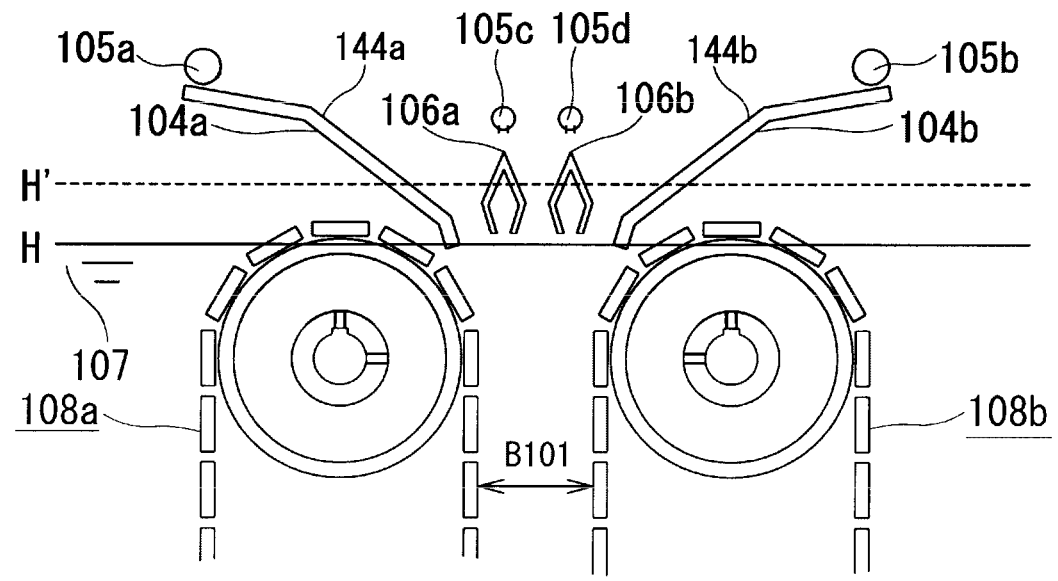

A nozzle 103 has the three hole groups 132a, 132b and 132c respectively including pluralities of holes 131a, 131b and 131c arranged in rectangular shape as shown in FIGS. 10, 11A and 12. The hole-free region 133a is formed between the hole groups 132a and 132b, and the hole-free region 133b is formed between the hole groups 132b and 132c.

Figure 11B:
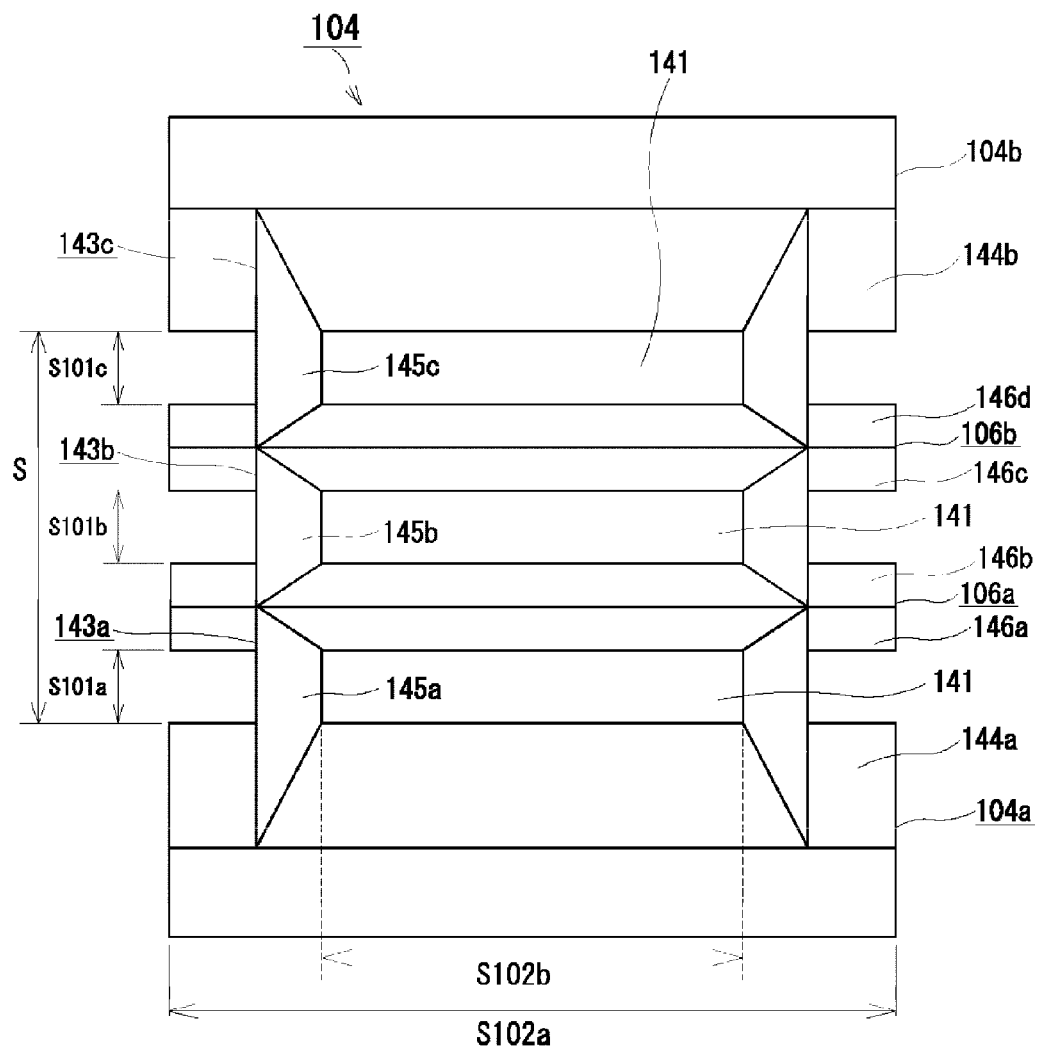
FIG. 11B is a plan view illustrating first chutes 104a and 104b and second chutes 106a and 106b according to Embodiment 2.

As shown in FIGS. 10, 11B and 12, the second chutes 106a and 106b are provided between the chutes 104 and are respectively located below the hole-free regions 133a and 133b. The second chute 106a is provided between a longitudinal side 122b of an assembly 121a and a longitudinal side 122c of an assembly 121b, and the second chute 106b is provided between a longitudinal side 122d of the assembly 121b and a longitudinal side 122e of the assembly 121c. The second chute 106a has an inclined surface 146a downward inclined toward the assembly 121*a* and an inclined surface 146*b* downward inclined toward the assembly 121*b*. The second chute 106*b* has an inclined surface 146*c* downward inclined toward the assembly 121*b* and an inclined surface 146*d* downward inclined toward the assembly 121*c*.

The inclined surface 146*a* of the second chute 106*a* is extended to a position that receives the longitudinal side 122*b*, and the inclined surface 146*b* is extended to a position that receives the longitudinal side 122*c*. The inclined surface 146*c* of the second chute 106*b* is extended to a position that receives the longitudinal side 122*d*, and the inclined surface 146*d* is extended to a position that receives the longitudinal side 122*e*.

The water supply port 105*c* is a pipe located below the center of the hole-free region 133*a* and above a top 106*c*. An opening 151*c* is provided across substantially the entire width in the longitudinal direction of the water supply port 105*c* above the second chute 106*a* to supply water to the respective inclined surfaces 146*a* and 146*b* (see FIG. 10). The water supply port 105*d* is located below the center of the hole-free region 133*b* and above a top 106*d*. An opening 151*d* is provided across substantially the entire width in the longitudinal direction of the water supply port 105*d* to supply water, warm water or hot water to the respective inclined surfaces 146*c* and 146*d* (see FIG. 10). The water supply ports 105*c* and 105*d* are connected to a water supply source (not shown).

According to the manufacturing method of three-dimensional net-like structures 110*a*, 110*b* and 110*c* according to Embodiment 2 of the invention, the three three-dimensional net-like structures 110*a*, 110*b* and 110*c* are manufactured as shown in FIG. 12. The assembly 121*b* vertically falls and is in contact with the second chutes 106*a* and 106*b* to start formation of loops. The assembly 121*b* then passes through the center opening 141 and reaches the water surface. Haul-off machines 108*a* and 108*b* are driven to convey the assembly 121*b* downward, while bringing the respective side faces of the assembly 121*b* into contact with the assemblies 121*a* and 121*c*. Other operation is similar to that of Embodiment 1.

Figure 16:
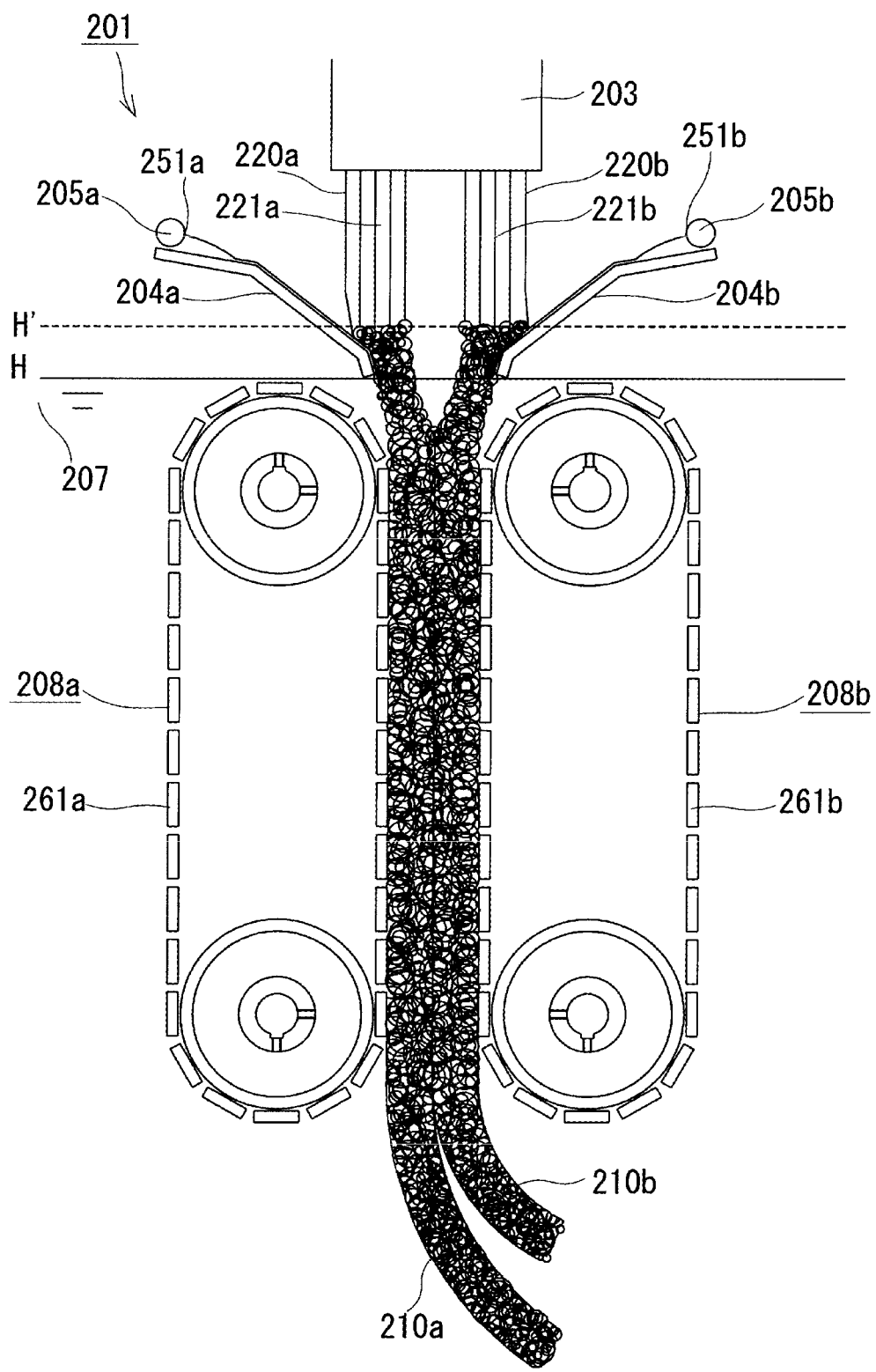
FIG. 16 is a front view illustrating a manufacturing apparatus 201 in use according to Embodiment 3 of the invention.

The following describes a three-dimensional net-like structure manufacturing apparatus 201 according to Embodiment 3 of the invention. For the purpose of discrimination from Embodiment 1, even the similar components to those of Embodiment 1 are shown by the like numerals to those of Embodiment 1 in the 200s; the description of Embodiment 1 is incorporated here and different points are mainly described below. As shown in FIG. 16, this Embodiment 3 with omission of the water supply port 5*c* and the second chute 6 enables two three-dimensional net-like structures 210*a* and 210*b* to be manufactured simultaneously, while further reducing the manufacturing cost. Embodiment 3 is similarly applicable to Embodiment 2. Chutes 204*a* and 204*b* in the longitudinal direction are provided in FIG. 16, but alternatively the chutes 43*a* and 43*b* in the short direction shown in FIG. 2 may be provided. In other words, haul-off machines 208*a* and 208*b* may hold the short-direction of the three-dimensional net-like structures 210*a* and 210*b*. The second chute 6*j* shown in FIG. 7B may be provided to ensure separation between the three-dimensional net-like structures 210*a* and 210*b*. According to this Embodiment 3, surface layers 12 (see FIG. 7A) are formed only on single outer faces in contact with the chutes 204*a* and 204*b*.

Figure 17:
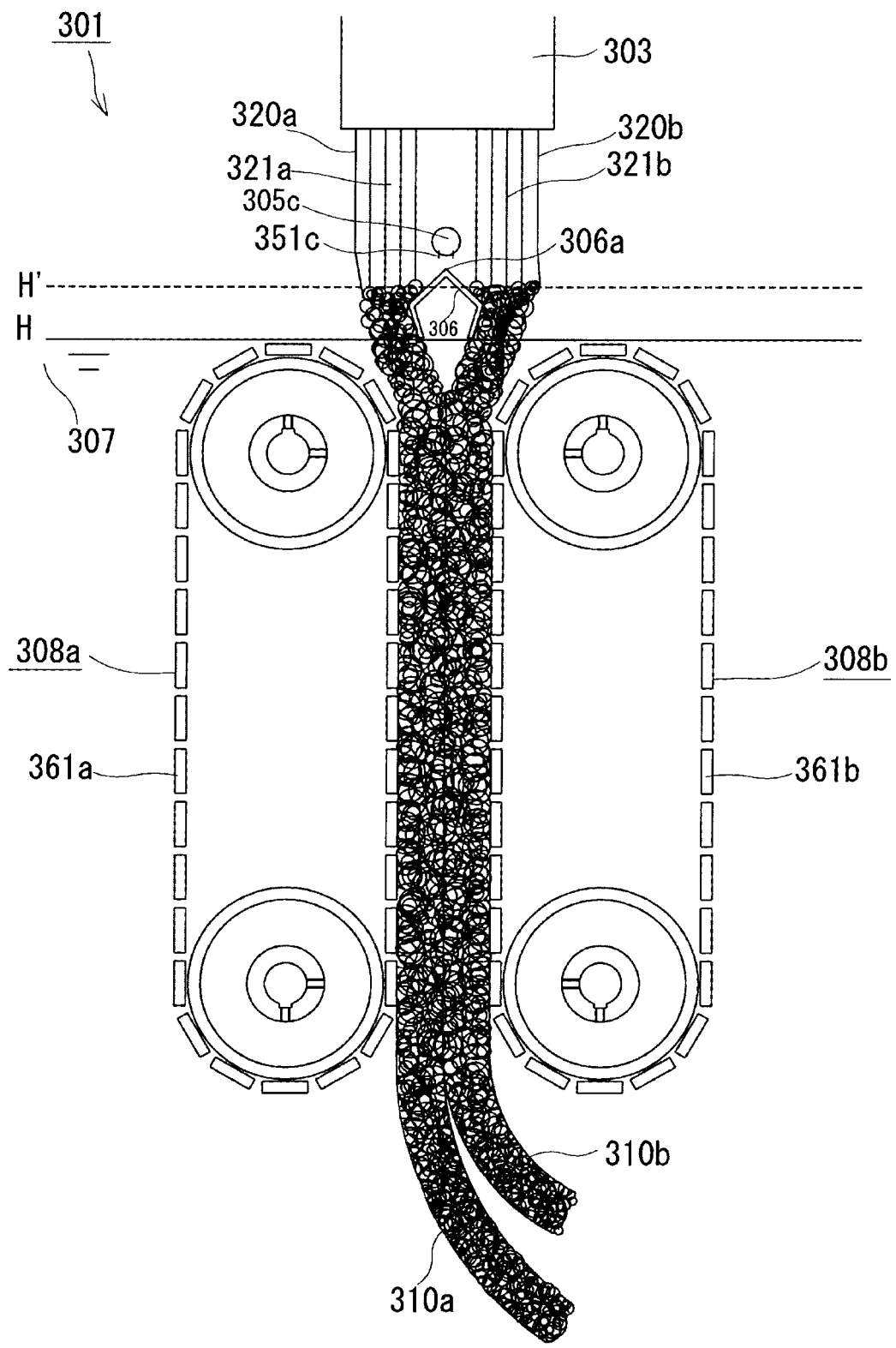
FIG. 17 is a front view illustrating a manufacturing apparatus 301 in use according to Embodiment 4 of the invention.

The following describes a three-dimensional net-like structure manufacturing apparatus 301 according to Embodiment 4 of the invention. For the purpose of discrimination from Embodiment 1, even the similar components to those of Embodiment 1 are shown by the like numerals to those of Embodiment 1 in the 300s; the description of Embodiment 1 is incorporated here and different points are mainly described below. As shown in FIG. 17, this Embodiment 4 with omission of the first chutes 4*a* and 4*b* and the water supply ports 5*a* and 5*b* enables two three-dimensional net-like structures 310*a* and 310*b* to be manufactured simultaneously, while further reducing the manufacturing cost. Embodiment 4 is similarly applicable to Embodiment 2. According to this Embodiment 4, surface layers 12 (see FIG. 7A) are formed only on single inner faces in contact with a chute 306.

Figure 18:
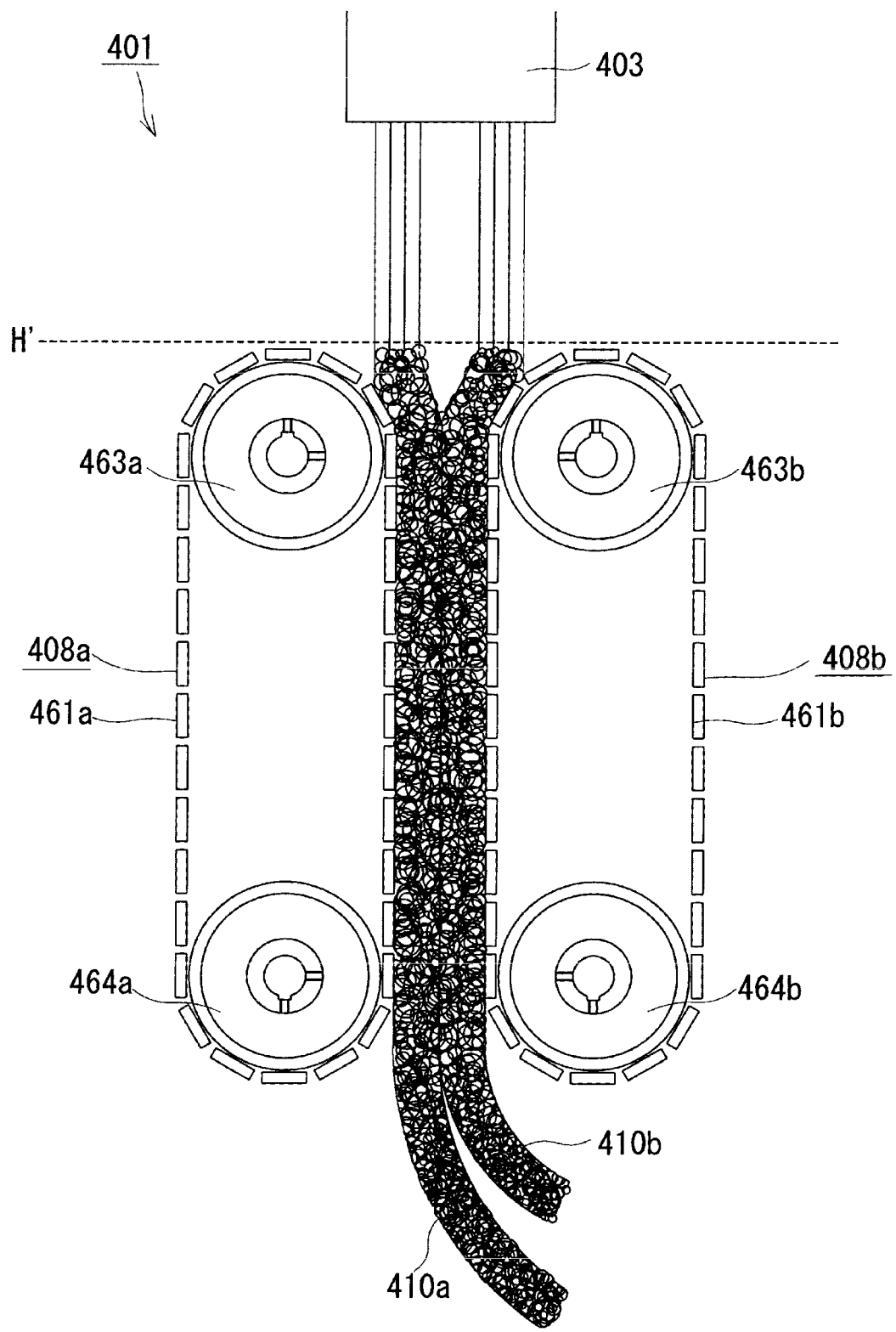
FIG. 18 is a front view illustrating a manufacturing apparatus 401 in use according to Embodiment 5 of the invention.

The following describes a three-dimensional net-like structure manufacturing apparatus 401 according to Embodiment 5 of the invention. For the purpose of discrimination from Embodiment 1, even the similar components to those of Embodiment 1 are shown by the like numerals to those of Embodiment 1 in the 400s; the description of Embodiment 1 is incorporated here and different points are mainly described below. As shown in FIG. 18, this Embodiment 5 with omission of the first chutes 4*a* and 4*b*, the water supply ports 5*a*, 5*b* and 5*c* and the second chute 6 enables two three-dimensional net-like structures 410*a* and 410*b* to be manufactured simultaneously, while further reducing the manufacturing cost. Embodiment 5 is similarly applicable to Embodiment 2.

Figure 19A:
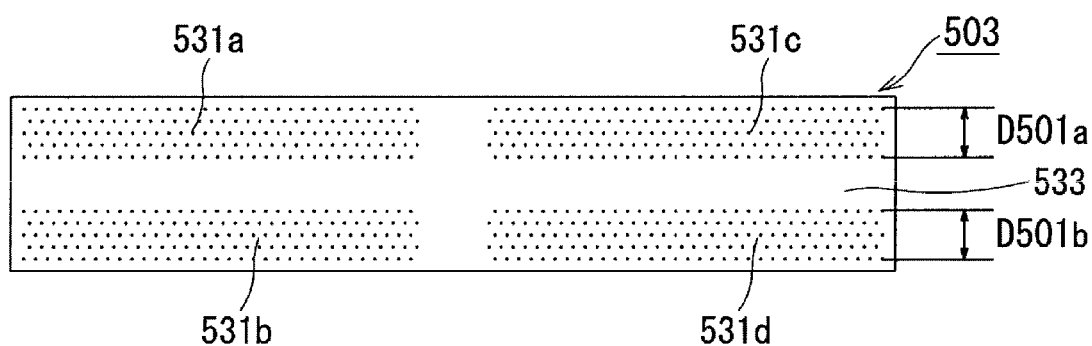
FIGS. 19A to 19E are bottom views illustrating nozzles 503 to 903 applicable to a manufacturing apparatus according to Embodiment 6 of the invention.
Figure 19B:
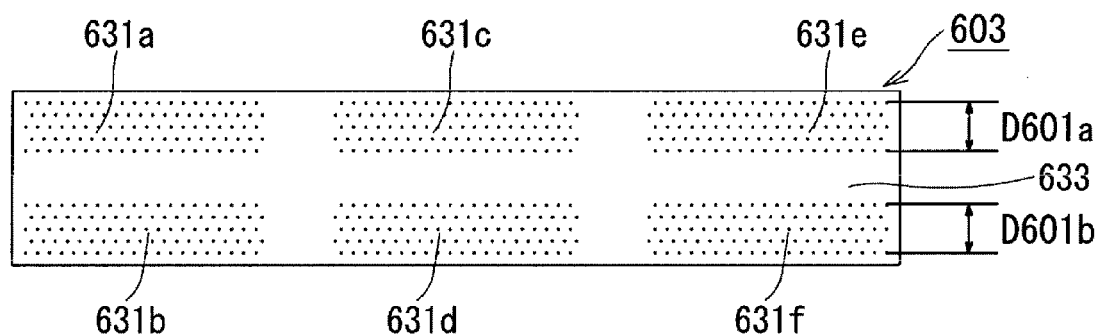
Figure 19C:
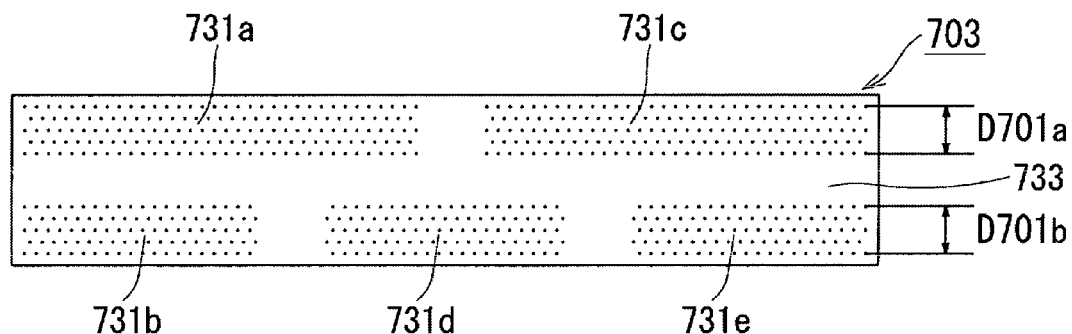
Figure 19D:
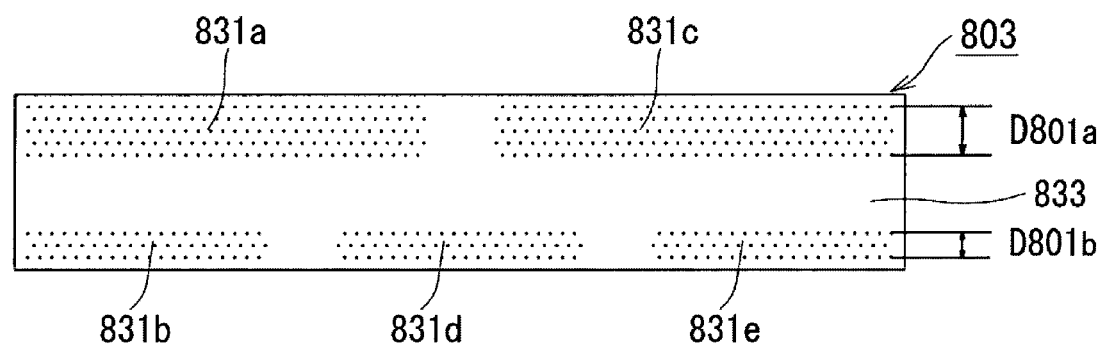
Figure 19E:
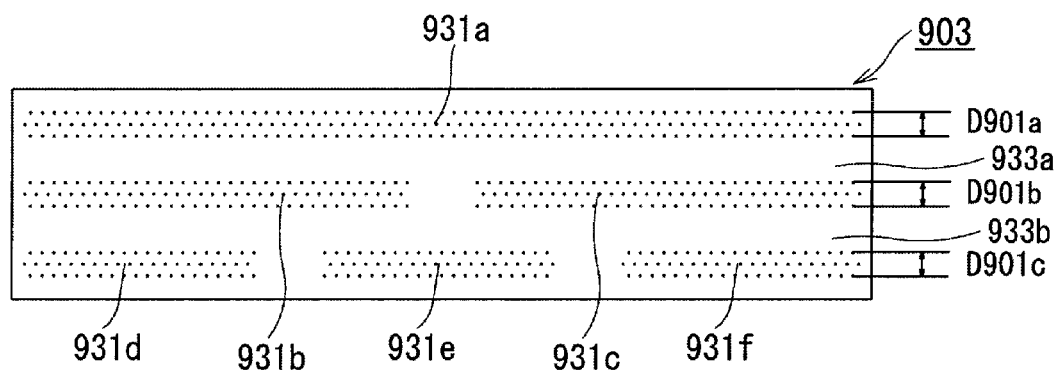

The following describes a three-dimensional net-like structure manufacturing apparatus according to Embodiment 6 of the invention. This embodiment shows modifications of the nozzle arrangement. The common part to the above embodiments is not specifically described or illustrated here, but the description and the illustration of the above embodiments are incorporated here. The respective components are shown by the like numerals to those of Embodiment 1 in the 500s to the 900s. As shown in FIG. 19A, a nozzle 503 has 2 row×2 column hole groups 531*a* to 531*d*. Hole-free regions 533 are formed in the length direction between the hole groups 531*a* and 531*c* and between the hole groups 531*b* and 531*d*. Four sheets of three-dimensional net-like structures can be manufactured by one single extrusion. As shown in FIG. 19B, a nozzle 603 has 2 row×3 column hole groups 631*a* to 631*f*. Hole-free regions 633 are formed between the hole groups 631*a* and 631*c*, between the hole groups 631*c* and 631*e*, between the hole groups 631*b* and 631*d* and between the hole groups 631*d* and 631*f*. Six sheets of three-dimensional net-like structures can be manufactured by one single extrusion. As shown in FIG. 19C, a nozzle 703 has two upper-row hole groups and three lower-row hole groups 731*a* to 731*e*; the length of the upper-row hole group is different from the length of the lower-row hole group. Hole-free regions 733 are formed in the length direction between the hole groups 731*a* and 731*c*, between the hole groups 731*b* and 731*d* and between the hole groups 731*d* and 731*e*. Five sheets of three-dimensional net-like structures having different sizes can be manufactured by one single extrusion. As shown in FIG. 19D, a nozzle 803 is a modification of the nozzle 703 of FIG. 19C; the width of hole groups 831*a* and 831*c* is different from the width of hole groups 831*b*, 831*d* and 831*e*. Hole-free regions 833 are formed in the length direction between the hole groups 831*a* and 831*c*, between the hole groups 831*b* and 831*d* and between the hole groups 831*d* and 831*e*. Five sheets of three-dimensional net-like structures having different sizes can be manufactured by one single extrusion. A nozzle 903 shown in FIG. 19E has one upper-row hole group 931*a*, two middle-row hole groups 931*b* and 931*c* and three lower-row hole groups 931d, 931e and 931f. Hole-free regions 933a and 933b are formed in the length direction between the hole groups 931b and 931c, between the hole groups 931d and 931e and between the hole groups 931e and 931f. Six sheets of three-dimensional net-like structures can be manufactured by one single extrusion. The number of columns, the number of rows, the length and the width of the hole groups may be set adequately. The presence of these hole-free regions enables the three-dimensional net-like structures to be extruded separately from each other. When there is a narrow interval between these hole-free regions, the adjacent filaments may be in contact with each other and tangled. In this case, the adjacent filament assemblies adhere to each other. This advantageously prevents the filament assemblies from being moved horizontally while the filament assemblies are hauled off by the haul-off machines. Additionally, short-direction chutes similar to any of the chutes 43a, 43b, 143a, 143b and 143c shown in FIGS. 2 and 11 may be provided below and corresponding to the above hole-free regions and arranged symmetrically (for example, in a mountain-like shape) to be orthogonal to the second chutes 6, 106a or 106b. These chutes may not be provided.

Figure 20A:
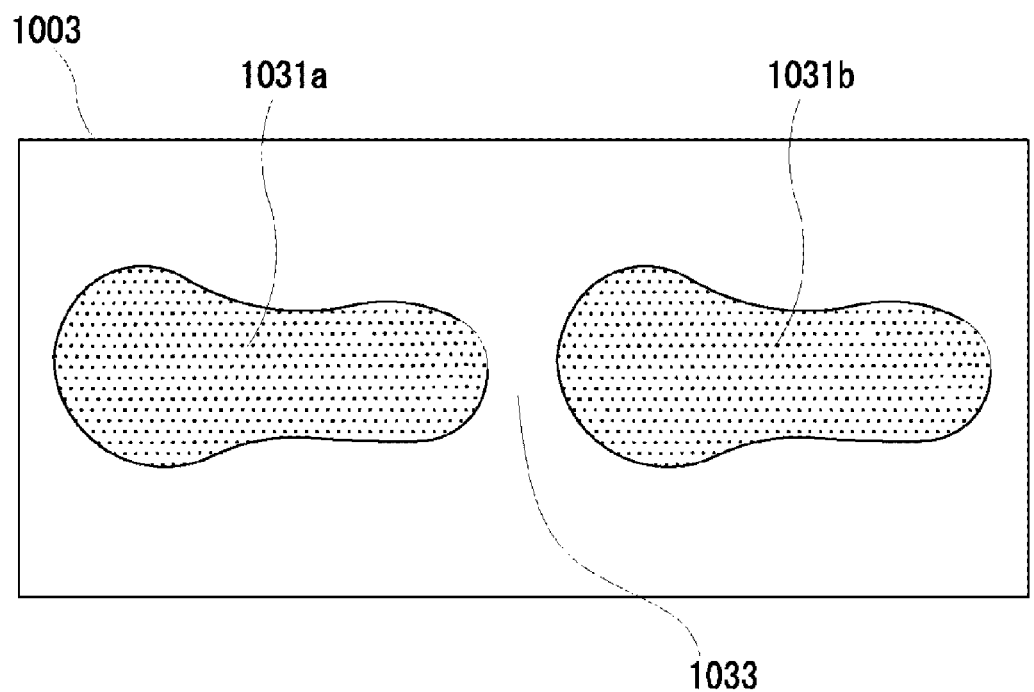
FIG. 20A is a bottom view illustrating a nozzle 1003 of a manufacturing apparatus according to Embodiment 7 of the invention.
Figure 20B:
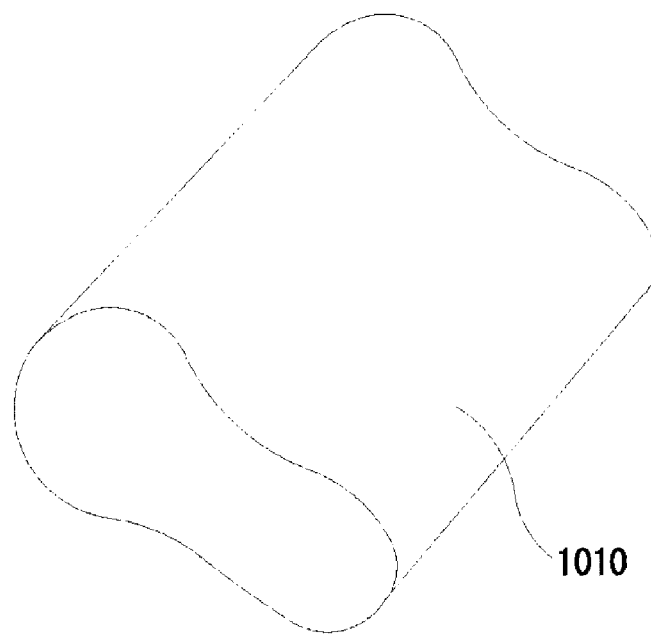
FIG. 20B is a perspective view schematically illustrating three-dimensional net-like structures 1010 manufactured by using this nozzle.
Figure 21:
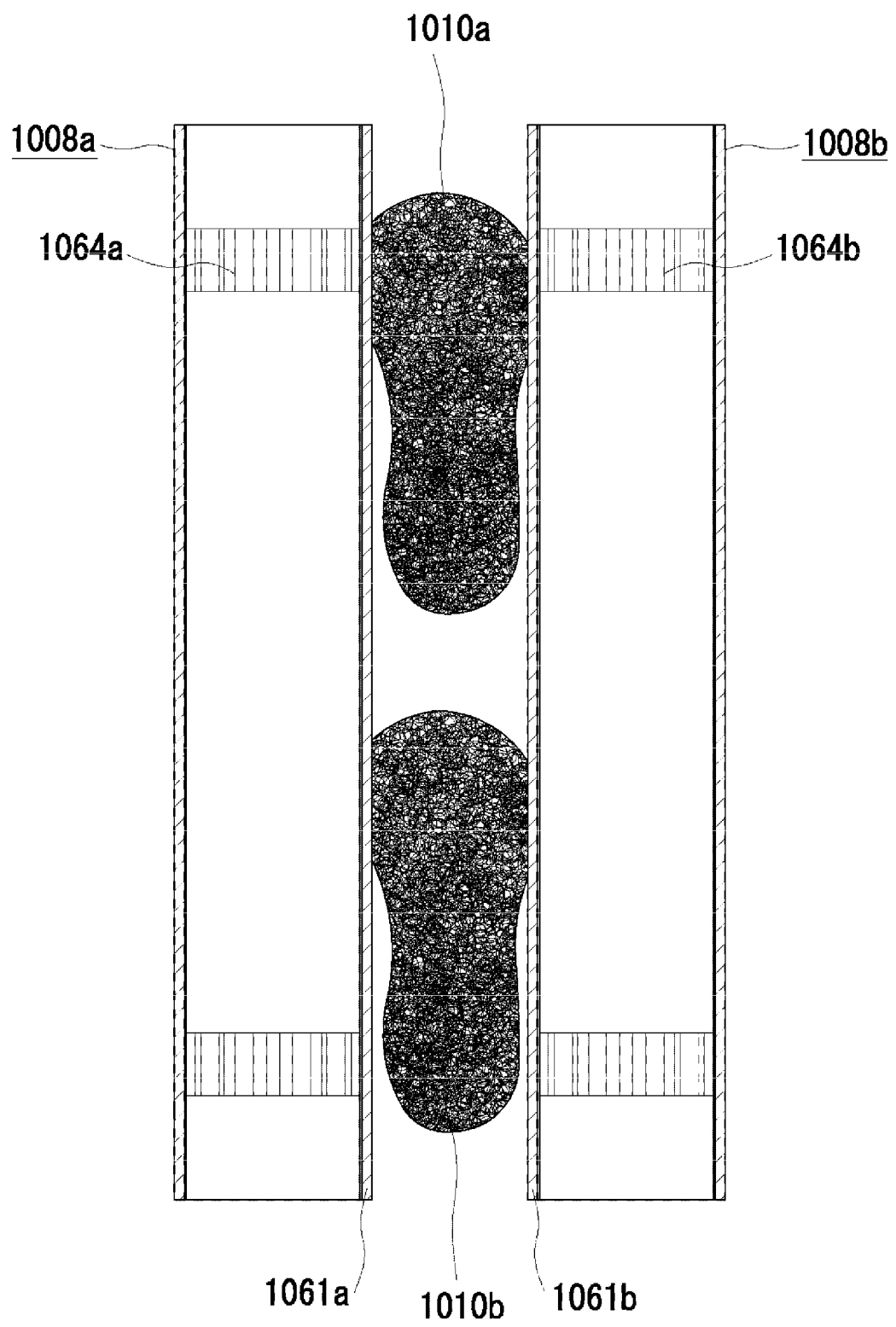
FIG. 21 is a plane sectional view illustrating a manufacturing process according to Embodiment 7.

The following describes a three-dimensional net-like structure manufacturing apparatus according to Embodiment 7 of the invention and three-dimensional net-like structures manufactured thereby. The common part to the above embodiments is not specifically described or illustrated here, but the description and the illustration of the above embodiments are incorporated here. The respective components are shown by the like numerals to those of Embodiment 1 in the 1000s. As shown in FIG. 20A, hole groups 1031a and 1031b of a nozzle 1003 are formed as gourd-shape regions and are arranged in series across a hole-free region 1033. As shown in FIG. 20b, a plurality of pillows 1010 of three-dimensional net-like structure can be manufactured by using this nozzle 1003. In this manufacturing process, both assemblies 1010a and 1010b extruded from the hole groups 1031a and 1031b are in contact with, are interposed in series between, and hauled off by haul-off machines 1008a and 1008b. This process is shown in a plane sectional view of FIG. 21, like FIG. 5.

Figure 22A:
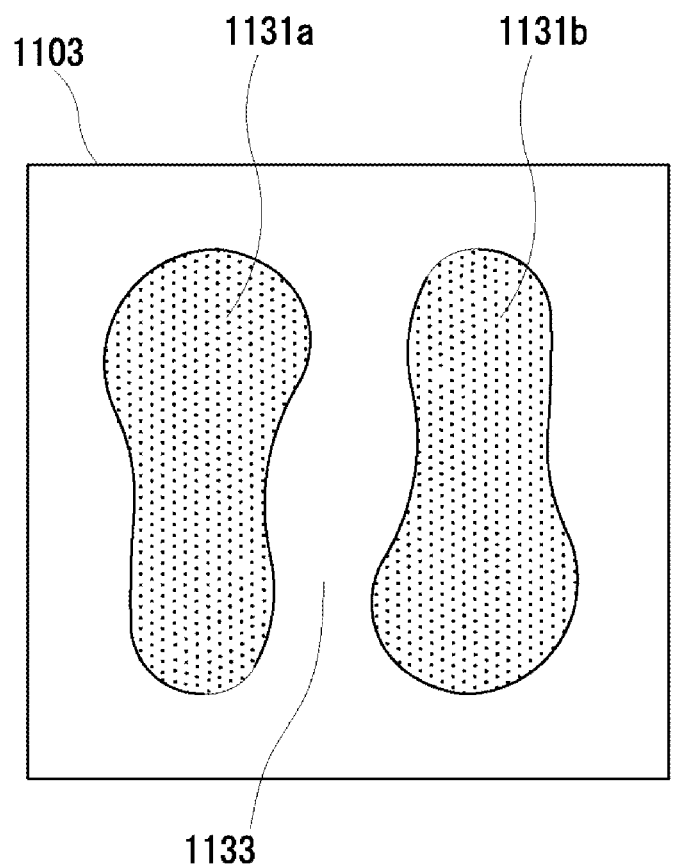
FIG. 22A is a bottom view illustrating a nozzle 1103 of a manufacturing apparatus according to Embodiment 8 of the invention.
Figure 22B:
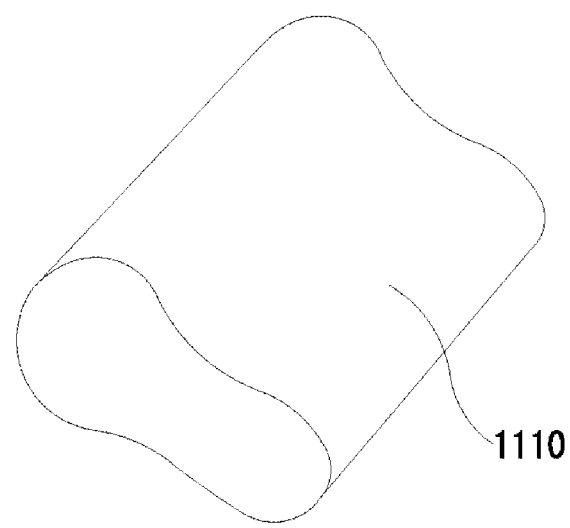
FIG. 22B is a perspective view schematically illustrating three-dimensional net-like structures 1110 manufactured by using this nozzle.
Figure 23:
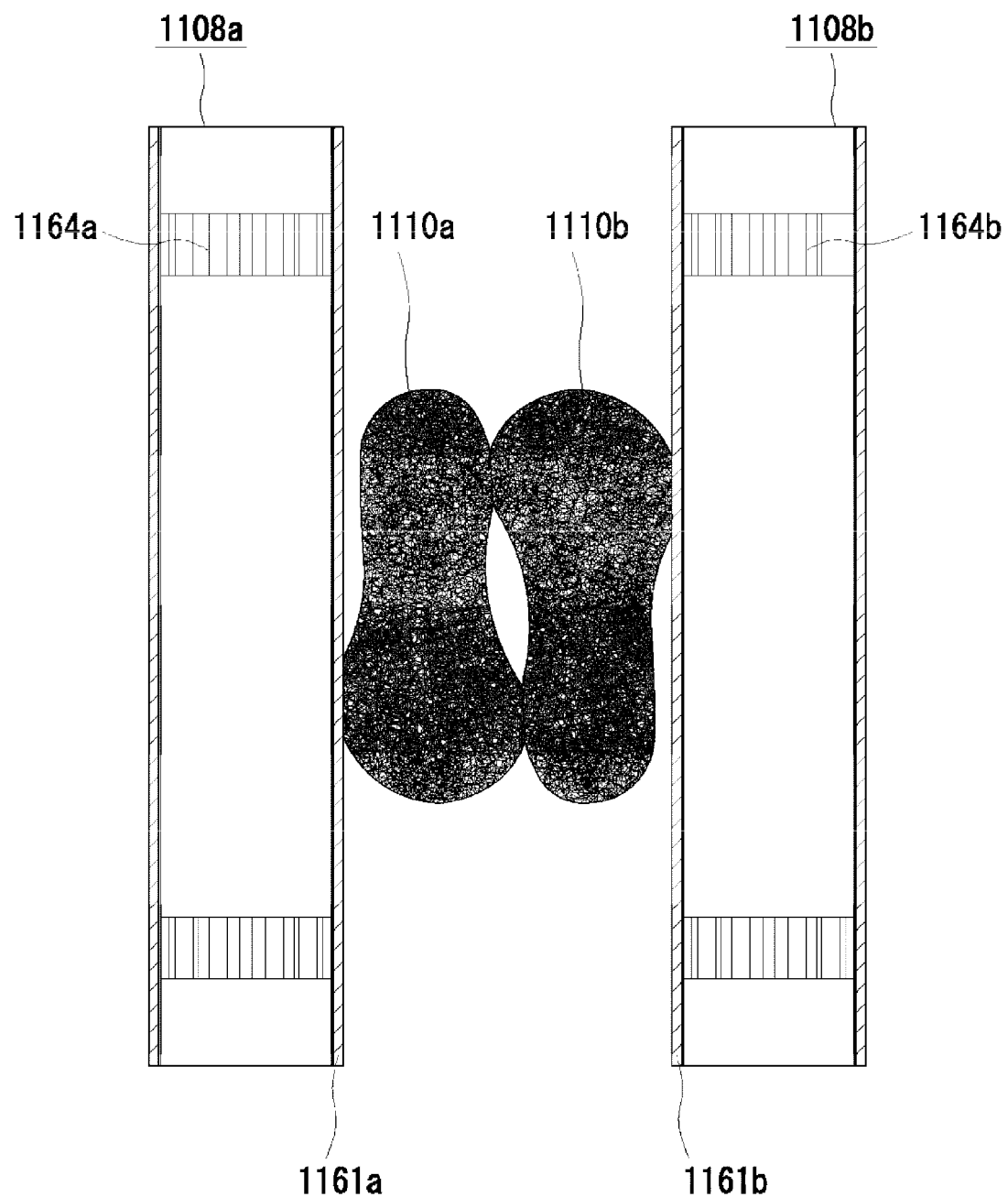
FIG. 23 is a plane sectional view illustrating a manufacturing process according to Embodiment 8.

The following describes a three-dimensional net-like structure manufacturing apparatus according to Embodiment 8 of the invention and three-dimensional net-like structures manufactured thereby. The common part to the above embodiments is not specifically described or illustrated here, but the description and the illustration of the above embodiments are incorporated here. The respective components are shown by the like numerals to those of Embodiment 1 in the 1100s. This Embodiment 8 manufactures pillows 1110 of three-dimensional net-like structure in a similar shape to that of Embodiment 7. As shown in FIG. 22A, hole groups 1131a and 1131b are arranged, such that longitudinal faces of the pillows 1110 face each other across a hole-free region 1133. A haul-off machine 1108a is in contact with an outer longitudinal face of an assembly 1121a, while a haul-off machine 1108b is in contact with an outer longitudinal face of an assembly 1121b. The assemblies 1121a and 1121b are interposed between in the above manner and hauled off by the haul-off machines 1108a and 1108b. When this positional relationship is viewed from the width direction, the haul-off machine 1108a, the assembly 1121a, the assembly 1121b and the haul-off machine 1108b are arranged in this sequence. This process is shown in a plane sectional view of FIG. 23, like FIG. 5. Since the pillows 1110 are hauled off while being partly compressed. It is accordingly desirable to cool down and stabilize the structure of the assemblies 1121a and 1121b to some extent, before the assemblies 1121a and 1121b are compressed by the haul-off machines 1108a and 1108b. For this purpose, it is preferable to increase the distance from a nozzle 1103 to the water surface or increase the distance from the water surface to the position where the assemblies 1121a and 1121b are compressed by the haul-off machines 1108a and 1108b.

The invention is not limited to the above embodiments but various modifications, substitutions and omissions may be made to the embodiments without departing from the scope of the invention. Such modifications, substitutions and omission as well as their equivalents are also included in the scope of the invention.

INDUSTRIAL APPLICABILITY

The invention is applicable to, for example, cushions for beds and mattresses and sheets for covers.

REFERENCE SIGN LIST 1, 101, 201, 301, 401: Three-dimensional net-like structure manufacturing apparatus
3, 103 203, 303, 403: Nozzle
31a, 31b, 131a, 131b, 131c: Hole
32a, 32b, 132a, 132b, 132c: Hole group
33, 133a, 133b: Hole-free region
4, 104: First chute
4a, 4b, 104a, 104b, 204a, 204b, 43a, 43b, 143a, 143b, 143c: Chute
41, 141: Opening
44a, 44b, 45a, 45b, 46a, 46b, 144a, 144b, 145a, 145b, 145c, 146a, 146b, 146c, 146d: Inclined surface
5a, 5b, 5c, 105a, 105b, 105c, 105d, 205a, 205b, 305c: Water supply port
51a, 51b, 51c, 151a, 151b, 151c, 151d, 251a, 251b, 351c: Opening
6, 106a, 106b, 306: Second chute
7, 107: Water tank
8a, 8b, 108a, 108b, 208a, 208b, 308a, 308b, 408a, 408b: Haul-off machine
10a, 10b, 110a, 110b, 110c, 210a, 210b, 310a, 310b, 410a, 410b: Three-dimensional net-like structure
20a, 20b, 120a, 120b, 220a, 220b, 320a, 320b, 420a, 420b: Filament
21a, 21b, 121a, 121b, 221a, 221b, 321a, 321b, 421a, 421b: Assembly
22a, 22b, 22c, 22d, 122a, 122b, 122c, 122d, 122e, 122f: Longitudinal side
23a, 23b, 23c, 23d, 123a, 123b, 123c, 123d, 123e, 123f: Short-direction side
61a, 61b, 161a, 161b, 261a, 261b, 361a, 361b, 461a, 461b: Endless member
63a, 63b, 64a, 64b, 163a, 163b, 164a, 164b, 263a, 263b, 264a, 264b, 363a, 363b, 364a, 364b, 463a, 463b, 464a, 464b: Pulley
D1, D101: Width of nozzle 3
D1a: Width of hole group 32a
D1b: Width of hole group 32b
D101a: Width of hole group 132a
D101b: Width of hole group 132b
D101c: Width of hole group 132c
S: Width of lowermost interval between inclined surfaces 44a and 44b or 144a and 144b
S1a: Width of lowermost interval between inclined surfaces 44a and 46a S1*b*: Width of lowermost interval between inclined surfaces 44*b* and 46*b*
S2*a*: Length of inclined surfaces 44*a* and 44*b*
S2*b*: Length of lowermost interval between inclined surfaces 45*a* and 45*b*
S101*a*: Width of lowermost interval between inclined surfaces 144*a* and 146*a*
S101*b*: Width of lowermost interval between inclined surfaces 146*b* and 146*c*
S101*c*: Width of lowermost interval between inclined surfaces 146*d* and 144*b*
S102*a*: Length of inclined surfaces 144*a* and 144*b*
S102*b*: Length of lowermost interval between inclined surfaces 145*a* and 145*b*
H, H': Water level of water tank

The invention claimed is:

1. A method of simultaneously manufacturing a plurality of three dimensional randomly looped structures, the method comprising:
   a. extruding a plurality of assemblies of filaments from melted thermoplastic resin across a predetermined interval parallel to a longitudinal direction through a nozzle having hole groups and a hole-free region formed between the hole groups, each hole group comprising multiple rows of holes parallel to the longitudinal direction, each row of holes comprising a plurality of holes, such that the assemblies of filaments of the plurality of assemblies of filaments extruded from the hole groups are spatially separated from one another by the hole-free region and fall downwardly; and
   b. hauling off the plurality of assemblies of filaments at a lower rate than a rate at which the plurality of assemblies of filaments falls with a pair of haul-off machines which is arranged below the nozzle, so as to tangle and thermally fuse the plurality of assemblies of filaments irregularly and thereby form loops, and submerging the plurality of assemblies of filaments in water to cause the plurality of assemblies of filaments to cool down and solidify, such that the assemblies of filaments of the plurality of assemblies of filaments are spaced from one another when reaching a water surface of the water, whereby the assemblies of filaments are positioned adjacent to one another and are in contact with one another as the assemblies of filaments move between the pair of haul-off machines and are then separated from one another after passing through the haul-off machines, such that the plurality of three-dimensional randomly-looped structures corresponding to the plurality of assemblies of filaments is obtained.

2. A method of simultaneously manufacturing a plurality of three dimensional randomly looped structures, the method comprising:
   a. extruding a plurality of assemblies of filaments from melted thermoplastic resin across a predetermined interval through a nozzle having hole groups and a hole-free region formed between the hole groups, each hole group comprising multiple rows of holes, each row of holes being parallel to a longitudinal direction and comprising a plurality of holes, such that the assemblies of filaments of the plurality of assemblies of filaments extruded from the hole groups are spatially separated from one another by the hole-free region and fall downwardly;
   b. passing the plurality of assemblies of filaments between a pair of chutes, wherein the pair of chutes is downwardly inclined toward the plurality of assemblies of filaments and a flow of water is provided on the pair of chutes, and wherein the plurality of assemblies of filaments is brought into contact with the flow of water to tangle and thermally fuse the plurality of assemblies of filaments irregularly, so as to form loops; and
   c. hauling off the plurality of assemblies of filaments at a lower rate than a rate at which the plurality of assemblies of filaments falls with a pair of haul-off machines which is arranged below the nozzle, and submerging the plurality of assemblies of filaments in water to cause the plurality of assemblies of filaments to cool down and solidify, such that the assemblies of filaments of the plurality of assemblies of filaments are spaced from one another when reaching a water surface of the water, whereby the assemblies of filaments are positioned adjacent to one another and are in contact with one another as the assemblies of filaments move between the pair of haul-off machines and are then separated from one another after passing through the haul-off machines, such that the plurality of three-dimensional randomly-looped structures corresponding to the plurality of assemblies of filaments is obtained.

3. A method of simultaneously manufacturing a plurality of three dimensional randomly looped structures, the method comprising:
   a. extruding a plurality of assemblies of filaments from melted thermoplastic resin across a predetermined interval through a nozzle having hole groups and a hole-free region formed between the hole groups, each hole group comprising multiple rows of holes, each row of holes comprising a plurality of holes, such that the assemblies of filaments of the plurality of assemblies of filaments extruded from the hole groups are spatially separated from one another by the hole-free region and fall downwardly;
   b. passing the plurality of assemblies of filaments between a pair of first chutes and a second chute, wherein the pair of first chutes is downwardly inclined toward the plurality of assemblies of filaments and a flow of water is provided on the pair of first chutes and the second chute, and wherein the plurality of assemblies of filaments is brought into contact with the flow of water to tangle and thermally fuse the plurality of assemblies of filaments irregularly, so as to form loops; and
   c. hauling off the plurality of assemblies of filaments at a lower rate than a rate at which the plurality of assemblies of filaments falls with a pair of haul-off machines which is arranged below the nozzle, and submerging the plurality of assemblies of filaments in water to cause the plurality of assemblies of filaments to cool down and solidify, such that the assemblies of filaments of the plurality of assemblies of filaments are spaced from one another when reaching a water surface of the water, whereby the assemblies of filaments are positioned adjacent to one another and are in contact with one another as the assemblies of filaments move between the pair of haul-off machines and are then separated from one another after passing through the haul-off machines, such that the plurality of three-dimensional randomly-looped structures corresponding to the plurality of assemblies of filaments is obtained.

4. A method of simultaneously manufacturing a plurality of three dimensional randomly looped structures, the method comprising:
   a. extruding a plurality of assemblies of filaments from melted thermoplastic resin across a predetermined interval through a nozzle having hole groups and a hole-free region formed between the hole groups, each hole group comprising multiple rows of holes, each row of holes comprising a plurality of holes, such that the assemblies of filaments of the plurality of assemblies of filaments extruded from the hole groups are spatially separated from one another by the hole-free region and fall downwardly;

b. passing the plurality of assemblies of filaments along a pair of chutes and a flow of water is provided on the pair of chutes, wherein the plurality of assemblies of filaments is brought into contact with the flow of water to tangle and thermally fuse the plurality of assemblies of filaments irregularly, so as to form loops, and wherein the pair of chutes is arranged in a mountain-like shape having a top located below the hole-free region and inclined surfaces, which are downwardly inclined from the top toward the plurality of assemblies of filaments, wherein the pair of chutes is joined at the top; and c. hauling off the plurality of assemblies of filaments at a lower rate than a rate at which the plurality of assemblies of filaments falls with a pair of haul-off machines which is arranged below the nozzle, and submerging the plurality of assemblies of filaments in water to cause the plurality of assemblies of filaments to cool down and solidify, such that the assemblies of filaments of the plurality of assemblies of filaments are spaced from one another when reaching a water surface of the water, whereby the assemblies of filaments are positioned adjacent to one another and are in contact with one another as the assemblies of filaments move between the pair of haul-off machines and are then separated from one another after passing through the haul-off machines, such that the plurality of three-dimensional randomly-looped structures corresponding to the plurality of assemblies of filaments is obtained.

* * * * *